US012127988B2

(12) United States Patent
Walke

(10) Patent No.: US 12,127,988 B2
(45) Date of Patent: Oct. 29, 2024

(54) TRANSFER ASSEMBLY FOR A HOIST

(71) Applicant: Liko Research & Development AB, Luleå (SE)

(72) Inventor: James Walke, Batesville, IN (US)

(73) Assignee: Liko Research & Development AB, Lulea (SE)

( * ) Notice: Subject to any disclaimer, the term of this patent is extended or adjusted under 35 U.S.C. 154(b) by 896 days.

(21) Appl. No.: 17/205,972

(22) Filed: Mar. 18, 2021

(65) Prior Publication Data

US 2021/0298976 A1 Sep. 30, 2021

Related U.S. Application Data

(60) Provisional application No. 63/000,657, filed on Mar. 27, 2020.

(51) Int. Cl.
*A61G 7/10* (2006.01)
*B61B 3/02* (2006.01)
*B61B 13/04* (2006.01)

(52) U.S. Cl.
CPC ......... *A61G 7/1042* (2013.01); *A61G 7/1034* (2013.01); *A61G 7/1051* (2013.01);
(Continued)

(58) Field of Classification Search
CPC .. A61G 7/1042; A61G 7/1015; A61G 7/1051; A61G 7/1025; A61G 7/1034;
(Continued)

(56) References Cited

U.S. PATENT DOCUMENTS 4,243,147 A * 1/1981 Twitchell ............. A61G 7/1042
212/327
4,372,452 A * 2/1983 McCord .................. B66C 19/00
212/331

(Continued)

FOREIGN PATENT DOCUMENTS

DE 8425773 U1 7/1988
EP 3335685 A1 * 6/2018 ........... A61G 7/1042
WO 198809159 A1 12/1988

OTHER PUBLICATIONS

Extended European Search Report dated Aug. 12, 2021, related to EP Patent Application No. 21164634.4.

*Primary Examiner* — S. Joseph Morano
*Assistant Examiner* — Cheng Lin
(74) *Attorney, Agent, or Firm* — Dinsmore & Shohl LLP

(57) ABSTRACT

A transfer assembly for a hoist unit for a patient includes a motor base, a first frame secured to the motor base for rotation about a pitch axis. The first frame includes one or more first suspension wheels rotatably affixed thereto for rotation about a laterally extending axis. The transfer assembly also includes a second frame secured to the first frame for rotation about a yaw axis. The second frame includes one or more second suspension wheels each of which is rotatably affixed thereto for rotation about a laterally extending axis. The transfer assembly also includes a drive wheel assembly rotatably mounted on the motor base for rotation about a laterally extending drive wheel axis. The transfer assembly also includes a motor assembly secured to the motor base and operatively connected to the drive wheel assembly such that operation of the motor rotates the drive wheel assembly.

16 Claims, 24 Drawing Sheets

(52) U.S. Cl.
CPC ................ *B61B 3/02* (2013.01); *B61B 13/04* (2013.01); *A61G 2203/12* (2013.01); *A61G 2203/78* (2013.01)

(58) Field of Classification Search
CPC ...................... A61G 2203/12; A61G 2203/78; B61B 13/04; B61B 3/02
See application file for complete search history.

(56) References Cited

U.S. PATENT DOCUMENTS

| | | | | |
|---|---|---|---|---|
| 5,138,953 | A * | 8/1992 | Horcher ............... | A61G 7/1015<br>212/331 |
| 8,549,679 | B2 * | 10/2013 | Tindall ................. | A61G 7/1055<br>5/81.1 R |
| 10,010,468 | B2 * | 7/2018 | Duquette ............. | A61G 7/1078 |
| 2009/0077737 | A1 * | 3/2009 | Dyhr .................... | A61G 7/1015<br>5/85.1 |
| 2019/0151178 | A1 * | 5/2019 | Westwood ........... | A61G 7/1042 |
| 2020/0183362 | A1 * | 6/2020 | Ledwith ............... | A61G 7/1061 |

* cited by examiner

TRANSFER ASSEMBLY FOR A HOIST

CROSS REFERENCE TO RELATED APPLICATIONS

The present specification claims the benefit of U.S. Provisional Patent Application Ser. No. 63/000,657 filed Mar. 27, 2021 and entitled "Transfer Assembly for a Hoist," the entirety of which is incorporated by reference herein.

FIELD

The subject matter of the present specification relates to transfer assemblies for hoisting devices used to hoist a patient and transport the patient along a hoist suspension rail.

TECHNICAL BACKGROUND

Overhead transport systems, such as overhead lift systems that include hoist units, may be used in hospitals, health care facilities, and/or home care settings to assist with moving a subject from one location to another and/or to assist with repositioning the subject from one posture to another. Conventional overhead lift systems utilize a sling or other lifting accessory to secure a subject to the overhead lift system and an actuator to lift the subject to a different elevation or lower the subject to a lower elevation. The hoist units of these overhead lift systems may be coupled to a rail or track with a transfer assembly. The rail is, in turn, affixed to the ceiling or other overhead structure. The transfer assembly facilitates traversing the hoist units along the rail manually or with a motor.

Segments of the rail may include curves and/or changes in elevation that may impede the travel of the transfer assembly along the rail. Accordingly, a need exists for alternative transfer assemblies and hoist units comprising the same.

SUMMARY

A transfer assembly for a hoist unit includes a motor base, a first frame secured to the motor base for rotation about a pitch axis. The first frame includes one or more first suspension wheels rotatably affixed thereto for rotation about a laterally extending axis. The transfer assembly also includes a second frame secured to the first frame for rotation about a yaw axis. The second frame includes one or more second suspension wheels each of which is rotatably affixed thereto for rotation about a laterally extending axis. The transfer assembly also includes a drive wheel assembly rotatably mounted on the motor base for rotation about a laterally extending drive wheel axis. The transfer assembly also includes a motor assembly secured to the motor base and operatively connected to the drive wheel assembly such that operation of the motor rotates the drive wheel assembly.

Additional features and advantages of the transfer assemblies described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
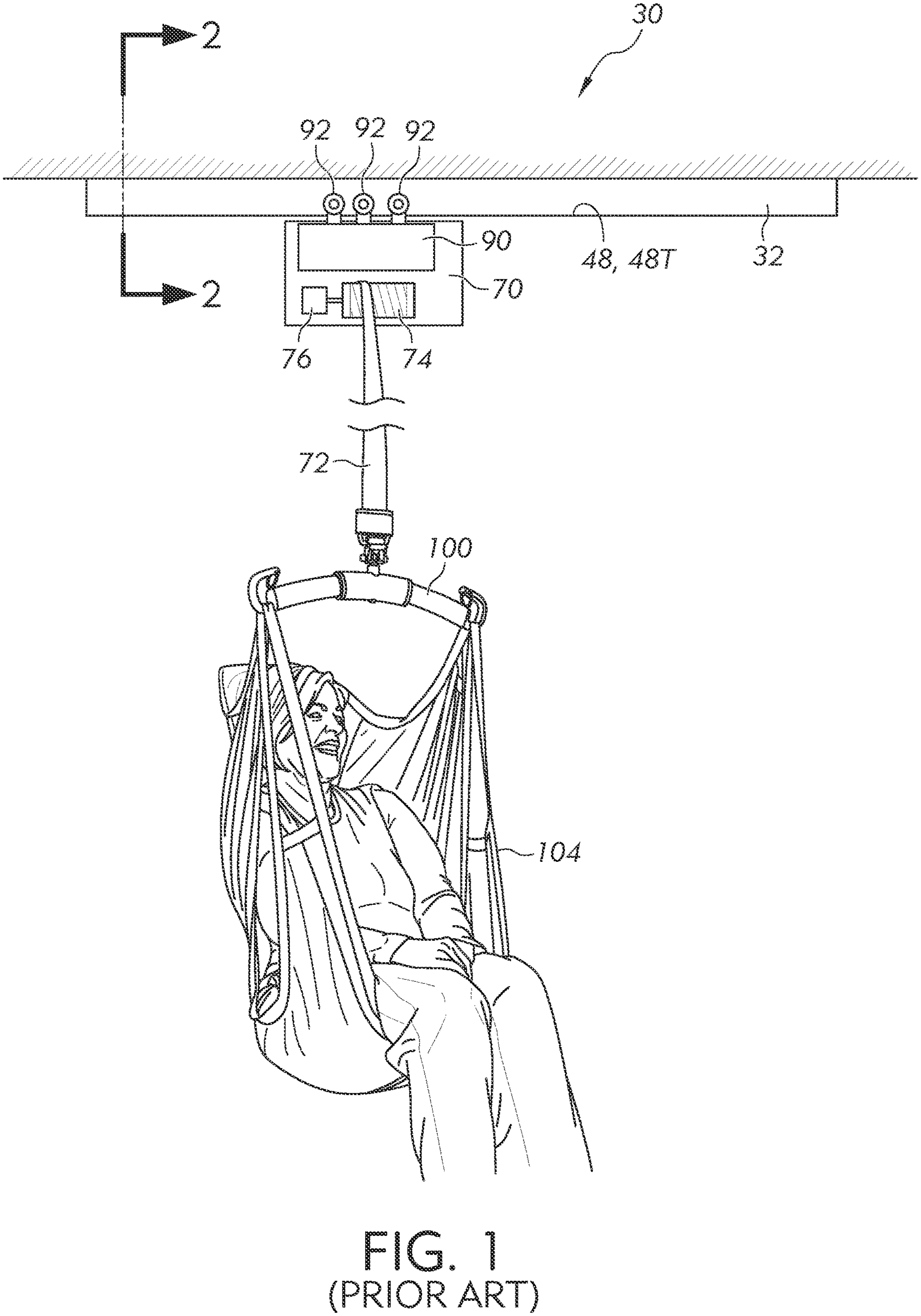
FIG. 1 (PRIOR ART)
FIG. 1 is a schematic view of a hoist and transport system having a rail network represented by a single rail, a conventional transfer assembly, a hoist attached to the transfer assembly, a hoist strap, a slingbar and a sling.

Reference will now be made in detail to embodiments of transfer assemblies and hoist units comprising the same, examples of which are illustrated in the accompanying drawings. Whenever possible, the same reference numerals will be used throughout the drawings to refer to the same or like parts. According to one embodiment, a transfer assembly for a hoist unit comprising includes a motor base and a first frame secured to the motor base for rotation about a pitch axis. The first frame includes one or more first suspension wheels rotatably affixed thereto for rotation about a laterally extending axis. A second frame may be secured to the first frame for rotation about a yaw axis. The second frame includes one or more second suspension wheels each of which is rotatably affixed thereto for rotation about a laterally extending axis. A drive wheel assembly is rotatably mounted on the motor base for rotation about a laterally extending drive wheel axis and includes one or more drive wheels. A motor assembly may be secured to the motor base and operatively connected to the drive wheel assembly such that operation of the motor rotates the drive wheel assembly. Various embodiments of transfer assemblies and lift units comprising the same will be described herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The embodiments of the present disclosure may comprise one or more of the features recited in the appended claims and/or one or more of the following features or combinations thereof.

The terms "substantially" and "about" may be used herein to represent the inherent degree of uncertainty that may be attributed to any quantitative comparison, value, measurement or other representation. These terms are also used herein to represent the degree by which a quantitative representation may vary from a stated reference without resulting in a change in the basic function of the subject matter at issue.

The drawings accompanying this specification depict mutually orthogonal axes to indicate longitudinal (i.e., the +/−X directions of the coordinate axes depicted in the figures), lateral (i.e. +/−Y directions of the coordinate axes depicted in the figures), and vertical reference directions (i.e., the +/−Z directions of the coordinate axes depicted in the figures). Rotational senses are referred to as pitch (P) (rotation about a laterally extending axis), roll (R) (rotation about a longitudinally extending axis), and yaw (Y) (rotation about a vertically extending axis). It should be understood that terms of vertical distinction such as up, down, lower, higher, below, above, bottom, top are used as if the transfer assembly and related elements were in the orientation in which they are intended to be used. The terms left and right may be used as a convenience to identify and distinguish between laterally separated features.

FIG. 1 shows a hoist and transport system for use in a hospital or other health care setting, including a home care setting. The hoist and transport system is used to lift a non-ambulatory patient from a bed or chair and transport that patient from one place to another.

Figure 2:
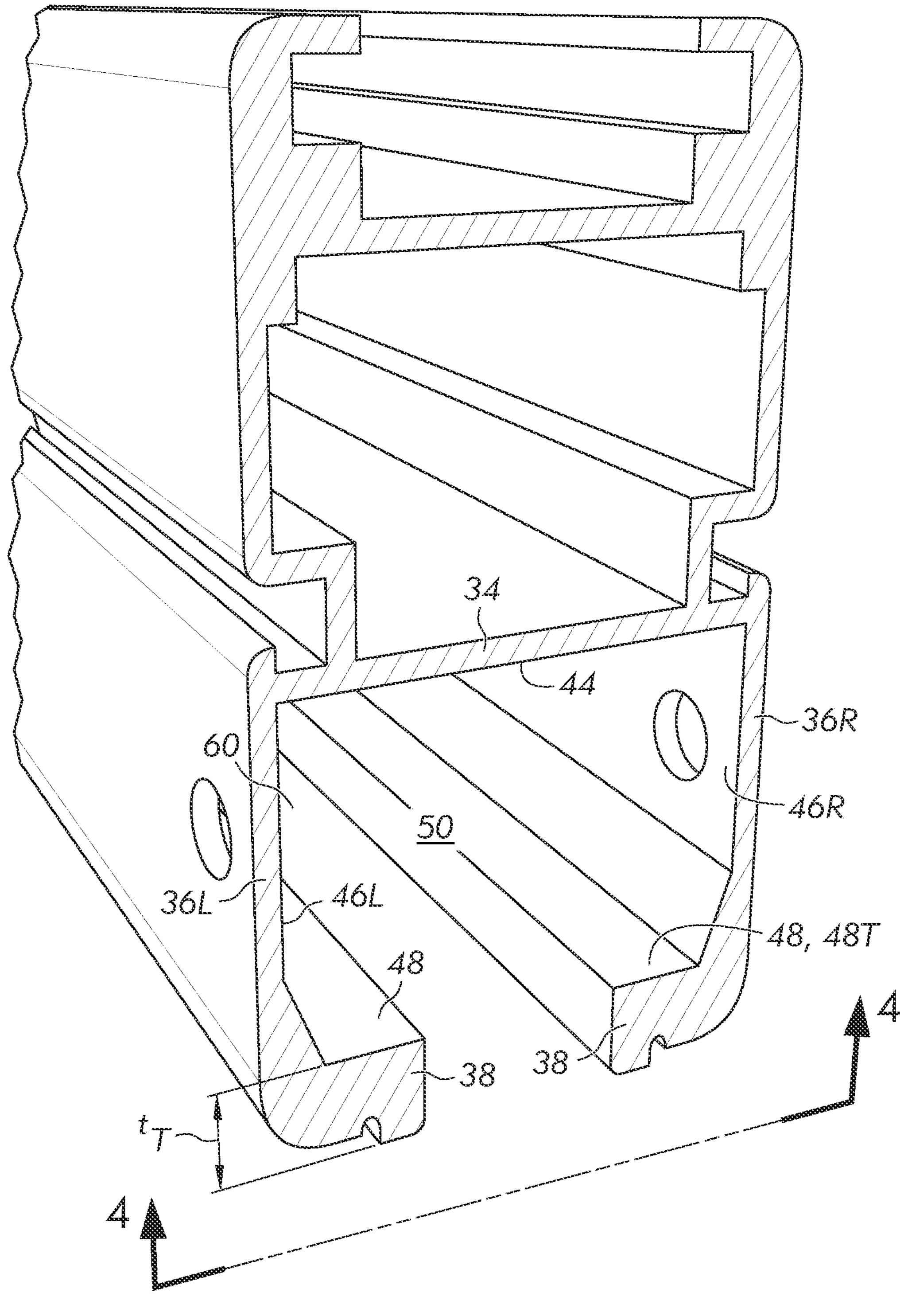
FIG. 2 (PRIOR ART)
FIG. 2 is a view of a typical rail of the rail system showing an open end of the rail and an interior of the rail.

A typical hoist and transport system includes a rail network 30 indicated in FIG. 1 by single rail 32. The rail network is mounted on an overhead structure, for example joists or other structural elements capable of supporting the expected loads. This specification may use the term "ceiling" to refer to the overhead structure. Referring additionally to FIG. 2, the rails of the network include a rail cover 34, left and right sidewalls 36L, 36R, and a track 38. The inner surfaces 44, 46L, 46R, 48, of the cover, sidewalls, and track define a rail interior 50. The inner surface 48 of the track is also referred to herein as the top 48T of the track, and the outer surface is referred to as the bottom 48B of the track. The track has a thickness $t_T$ between the top 48T and bottom 48B. At least one of the longitudinal extremities of the rail is open (i.e. the longitudinal extremity is an opening 60) so that a transfer assembly can be installed on the rail by way of the opening. Subsequent to installing the transfer assembly, an end stop (not illustrated) may be installed in the rail to prevent the transfer assembly from exiting the rail.

Figure 3:
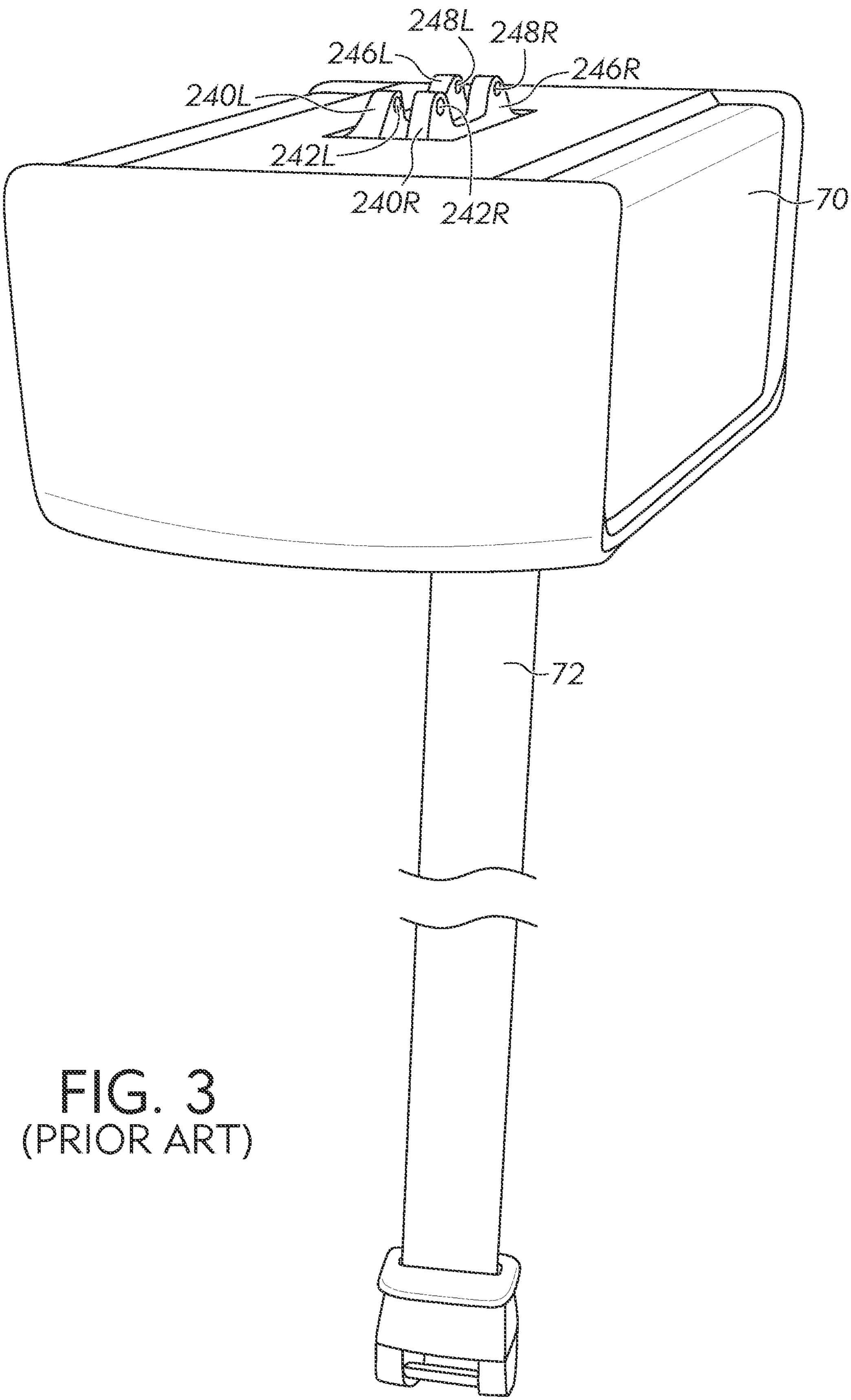
FIG. 3 (PRIOR ART)
FIG. 3 is a view of a typical hoist and strap.

Referring principally to FIGS. 1 and 3 the typical hoist and transport system also includes a hoist 70 having a strap 72, a spool 74, and a hoist motor 76 which can be operated to wind the strap onto the spool or unwind the strap from the spool.

The typical hoist and transport system also includes a transfer assembly 90 having suspension wheels 92 adapted to engage top 48T of the track. Hoist 70 is attached to the transfer assembly and is therefore suspended from the track by suspension wheels 92.

The components of the hoist and transport system also include a slingbar 100 attachable to a free end 102 of the strap (the end of the strap not attached to the spool) and a sling 104 which can be attached to the slingbar.

In practice, a caregiver attaches the slingbar to the strap, positions the sling under the patient, and attaches the sling to the slingbar. The caregiver then operates the spool motor to wind the strap onto the spool thereby lifting the patient from his bed or chair so that the patient is suspended from the rail by the hoist, slingbar and sling.

The caregiver may then transport the suspended patient to another location. Some hoists rely on manual transport, in which case the caregiver simply pulls on the sling or slingbar causing wheels 92 of the transfer assembly to roll along the track. Once the caregiver has pulled the patient to the desired location, he can once again operate the motor to lower the patient to the intended destination.

Other hoists offer power assisted transport capability. A power assisted transfer assembly may include, for example, a drive wheel, a spring (not illustrated) which urges the drive wheel into engagement with the bottom of the track, and a transfer motor for rotating the drive wheel. The caregiver operates the transfer motor, causing the drive wheel to rotate, thus propelling the hoist along the track due to traction between the drive wheel assembly and the bottom of the track. The suspension wheels roll along the top of the track as in the unpowered unit.

Figure 4:
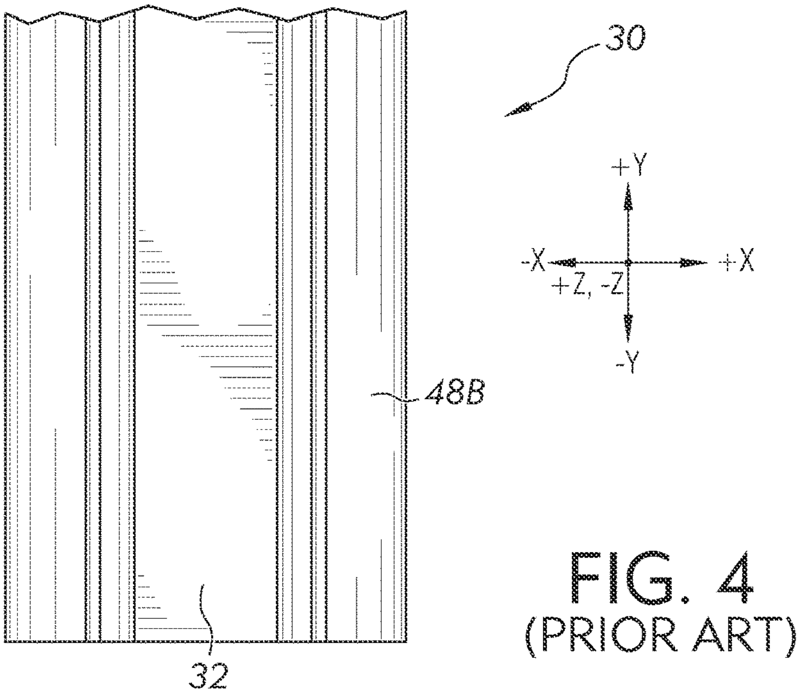
FIG. 4 (PRIOR ART)
FIG. 4 is a schematic plan view of overhead rail system components as seen by an observer looking vertically upwardly.
Figure 5:
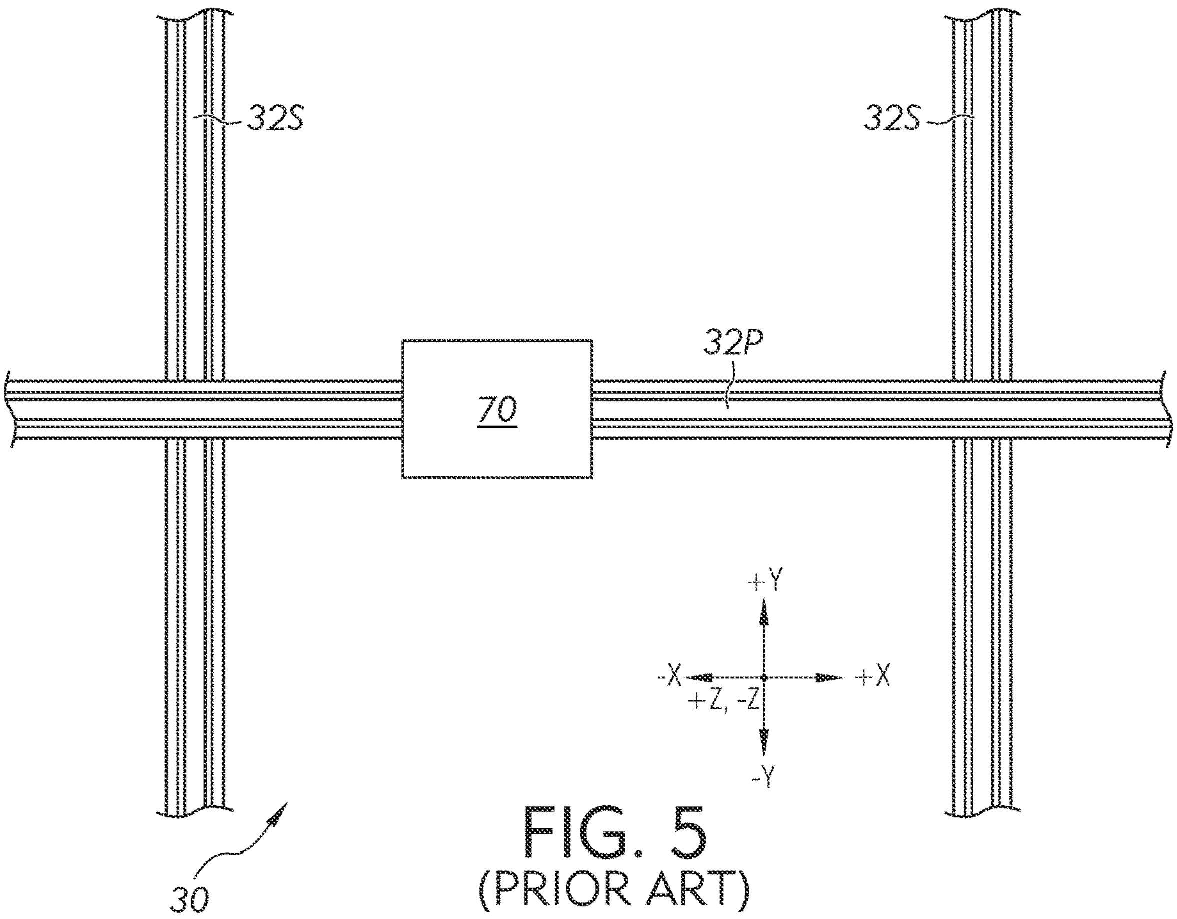
FIG. 5 (PRIOR ART)
FIG. 5 is a schematic plan view of overhead rail system components as seen by an observer looking vertically upwardly.

Referring to FIGS. 4-9, in one example the rail network may be as simple as a single straight rail 32 (FIG. 4). In another example (FIG. 5) the rail network may be a pair of secondary rails 32S connected to the ceiling parallel to each other (e.g. both extending longitudinally), and a primary rail 32P (analogous to single rail 32 of FIG. 4) suspended from and extending laterally between the secondary rails so that the primary rail can be moved longitudinally along the secondary rails. Hoist 70 is suspended from the primary rail.

Figure 6:
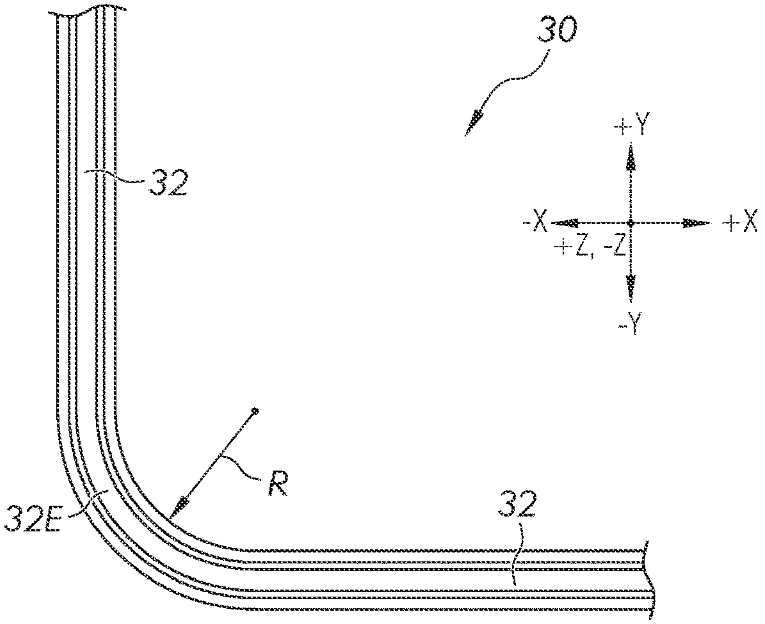
FIG. 6 (PRIOR ART)
FIG. 6 is a schematic plan view of overhead rail system components as seen by an observer looking vertically upwardly.
Figure 7:
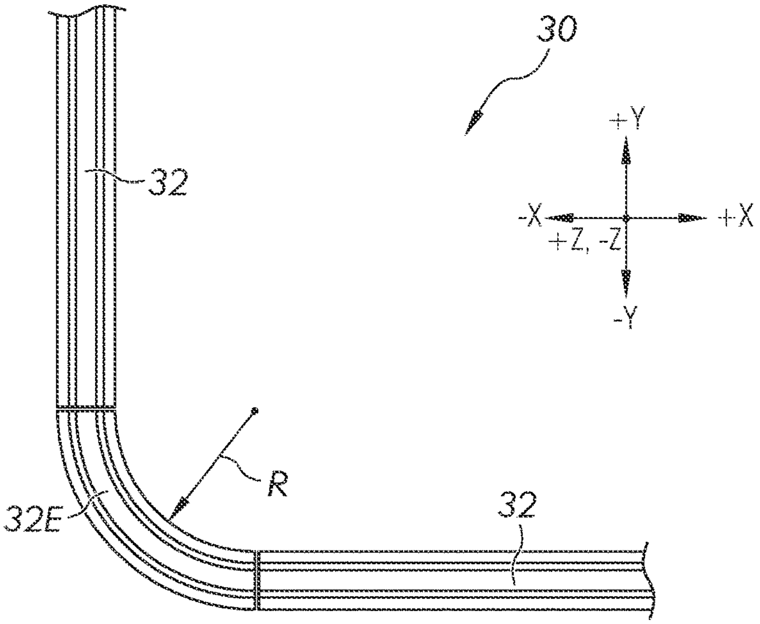
FIG. 7 (PRIOR ART)
FIG. 7 is a schematic plan view of overhead rail system components as seen by an observer looking vertically upwardly.

The patient can therefore be transported longitudinally by moving the primary rail along the secondary rails, and laterally by moving the hoist along the primary rail. Referring to FIGS. 6-7, in another example the rail network may include straight rail sections 32 and a curved elbow section 32E connecting the straight sections. The straight and curved sections may be a single piece as in FIG. 6 or may be individual segments mated to each other during installation of the rail network as in FIG. 7.

Figure 8:
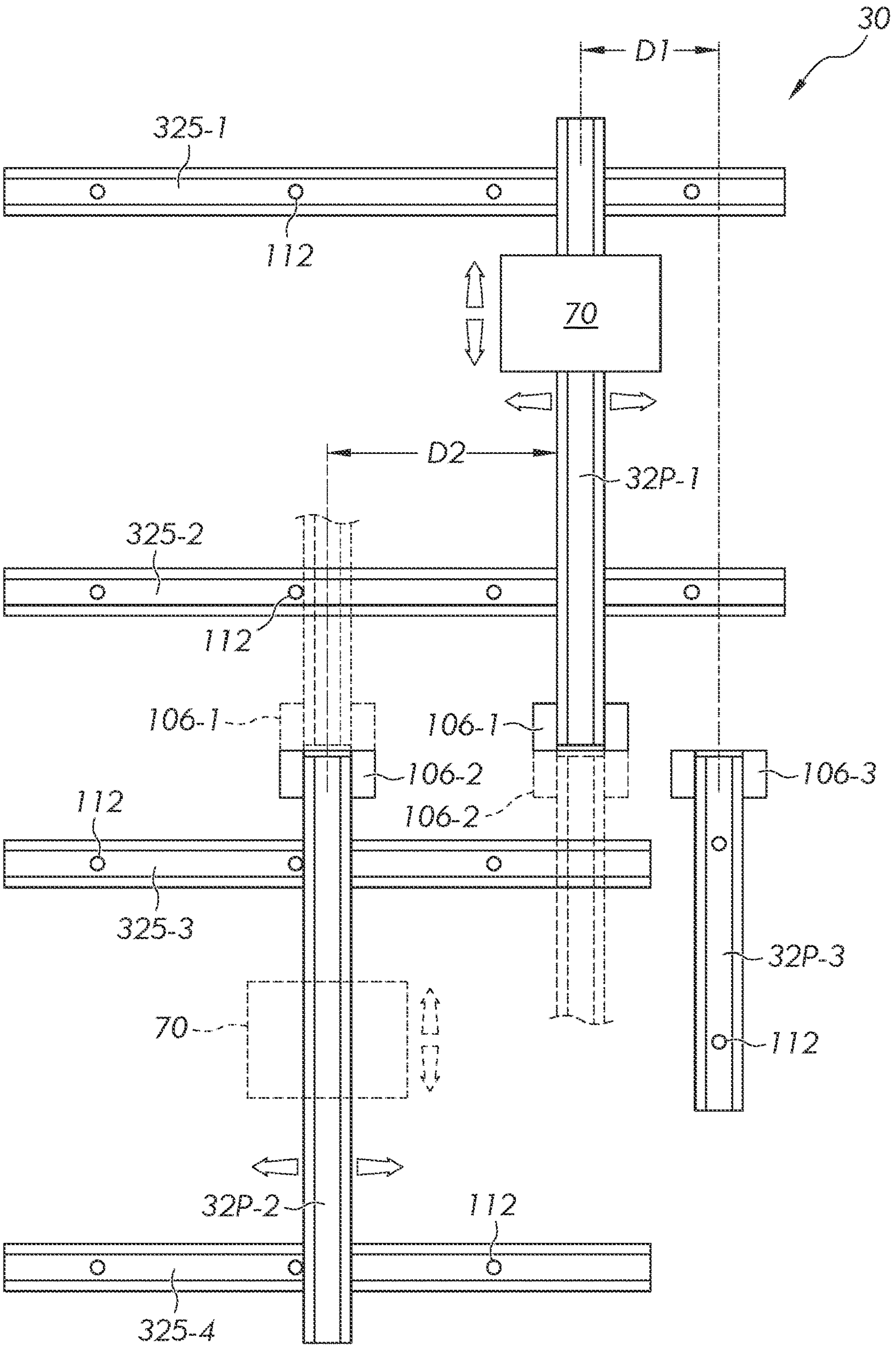
FIG. 8 is a schematic plan view of overhead rail system components as seen by an observer looking vertically upwardly.

Referring to FIG. 8 another example of a rail network includes secondary rails 32S-1, 32S-2 (illustrated as suspended from the ceiling by hangers 112) and a primary rail 32P-1. The primary rail, like the primary rail 32P of FIG. 5, suspends hoist 70 and is translatable along the secondary rails. Unlike the primary rail of FIG. 5, primary rail 32P-1 of FIG. 8 includes a coupler 106-1 at at least one of its two lateral ends. The coupler is designed to mate with a companion coupler such as couplers 106-2 and 106-3 on primary rails 32P-2 and 32P-3 to extend the longitudinal range of the hoist. The illustration shows one example, in phantom, in which rail 32P-1 has been translated a distance $D_1$ so that its coupler 106-1 mates with coupler 106-3 of stationary primary rail 32P-3. The illustration shows a second example, also in phantom, in which rail 32P-2 has been translated a distance $D_2$ along secondary rails 32S-3 and 32S-4 so that its coupler 106-2 mates with coupler 106-1 of translatable primary rail 32P-1.

Figure 9:
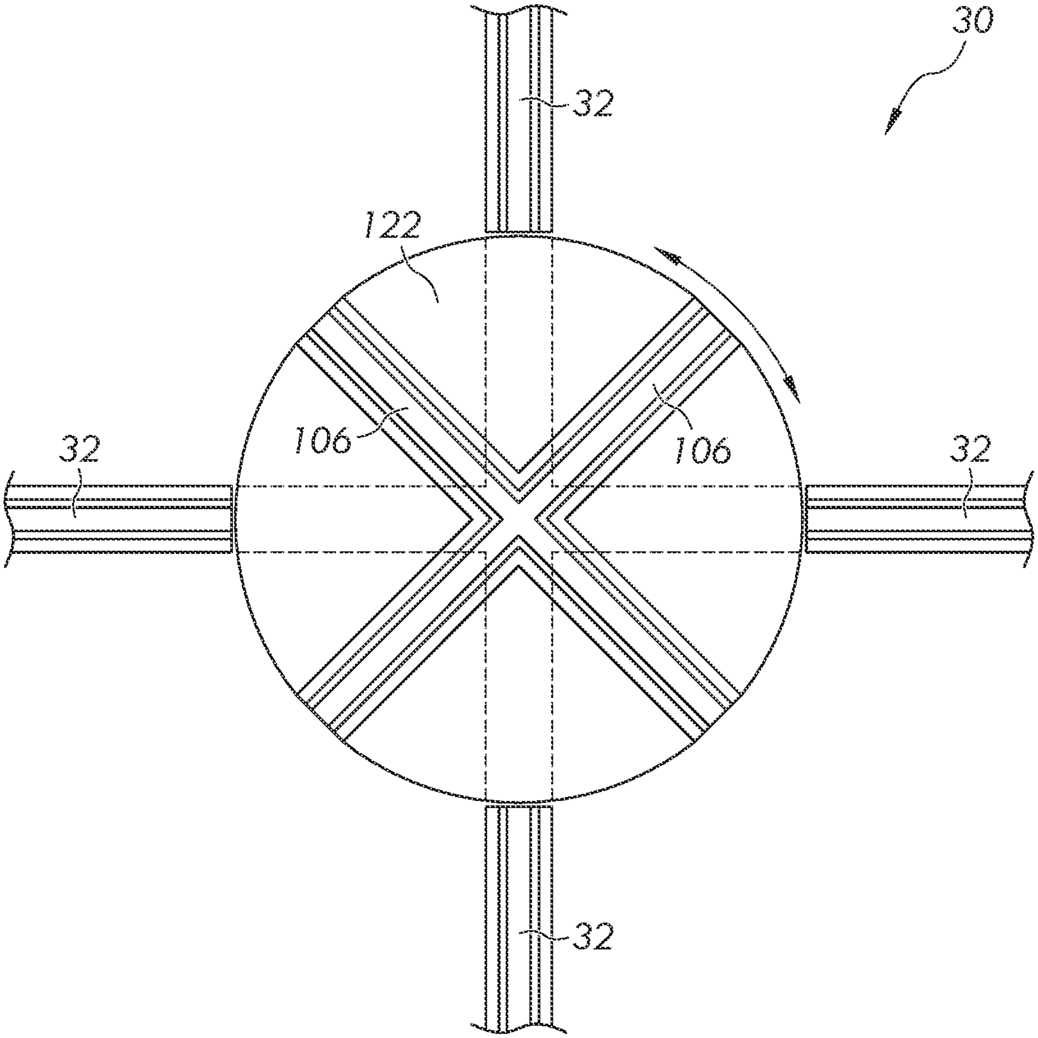
FIG. 9 is a schematic plan view of overhead rail system components as seen by an observer looking vertically upwardly.

FIG. 9 shows another example of a rail network that includes a turntable 122. A caregiver may pull or power the transfer assembly of the hoist straight across the turntable, or may pause at the turntable, reorient the turntable to align its tracks with the track of a selected rail, and then pull or power the hoist onto the selected rail.

One difficulty that can arise with a powered transfer assembly results from using the unit for a particularly heavy patient. If the transfer assembly is designed to accommodate patients weighing up to, say, 200 kg, but a caregiver uses it to handle a patient weighing 300 kg, the additional weight may pull the drive wheel out of contact with the bottom of the track, or at least cause it to become less forcibly engaged with the track. As a result, the drive wheel will fail to drive the transfer assembly along the track, or will slip against the track as it propels the transfer assembly. Contact between the drive wheel and the track also needs to be forceful enough to initiate movement of the transfer assembly along the track even when faced with the greater inertia of the heavier patient. It is desirable to ensure constant contact between the drive wheel and the track and to reduce the likelihood of drive wheel slippage. That way the transfer assembly can accommodate a wide range of patient weights.

The above described problem of lost contact between the drive wheel and the track can also be the result of accumulated production tolerances.

Another difficulty that may arise is that the mated couplers 106 of the arrangement shown in FIG. 8 may not be strong enough to support the weight of an especially heavy patient on their own. It is therefore advisable to ensure that the couplers bear only part of the load while a rail 32 bears the rest of the load. This might be accomplished by using a longitudinally elongated transfer assembly in which the longitudinal spacing between the leading wheels and the trailing wheels is longer than the distance across the mated couplers. That way, while the leading wheels are rolling across the couplers, the trailing wheels remain on the rail behind the couplers. The trailing wheels do not roll onto the couplers until the leading wheels have rolled onto the destination rail.

Other difficulties may arise from deformities in the track. For example, the rails may include end stops that prevent a transfer assembly from traveling beyond the ends of the track. Excessively tight fastening of the end stops to the rail can cause a nearby deformity in the track, similar to a pothole in a road. A deformity may also take the form of a discontinuity where one track segment meets another track segment or meets a turntable or coupler. A suspension wheel may become trapped in the pothole-like deformity or may be unable to climb over a track discontinuity. A longitudinally elongated transfer assembly may help solve this problem as well, particularly if it includes numerous suspension wheels longitudinally distributed over a large distance.

However, the seemingly simple solution of providing an elongated transfer assembly with increased inter-wheel longitudinal spacing is not without disadvantages. At least one disadvantage is that the elongated transfer assembly may be too long to easily roll along a curved rail elbow such as those shown in FIGS. 6-7. In the worst case, the elongated transfer assembly may become jammed in the elbow. Such a difficulty might be addressed by providing an elbow section of increased radius R. Unfortunately, retrofitting a facility's existing rail network with increased radius elbows would be costly to the facility owner and would therefore reduce the commercial attractiveness of the transfer assembly despite whatever advantages it may confer. In addition, the manufacturer of the hoist and transport system would be burdened with the task of manufacturing and stocking two differently radiused elbows.

Referring now to FIGS. 10A-14, A transfer assembly 90 for a hoist includes a motor base 120 having laterally spaced apart left and right flanges 122L, 122R and a web 124 spanning laterally between upper edges 132L, 132R of the flanges. The web includes a window 140. The web may be thought of alternatively as ribs, for example first, second and third ribs 144, 146, 148 extending laterally between flange upper edges 132L, 132R so that ribs 144 and 146 define window 140. The space 150 between flange lower edges 152L, 152R is laterally unobstructed (or, equivalently, the laterally lower edges 152L, 152R define laterally unobstructed space 150). Flange 122L includes three openings 126. Flange 122R includes three openings 128 (only one of which is visible) aligned with openings 126. The purpose of openings 126, 128 is described below in connection with mounting an electric motor on the motor base.

The transfer assembly also includes a first frame 170 rotatably secured to the motor base for rotation about a pitch axis $A_P$. In the illustrated embodiment left and right spacers 172L, 172R center the first frame between motor base flanges 122L, 122R, and a bolt and nut 176, 178 secure the first frame and the spacers to the motor base. The connection effected by the bolt and nut permits rotation of the first frame about pitch axis $A_P$.

Figure 10A:
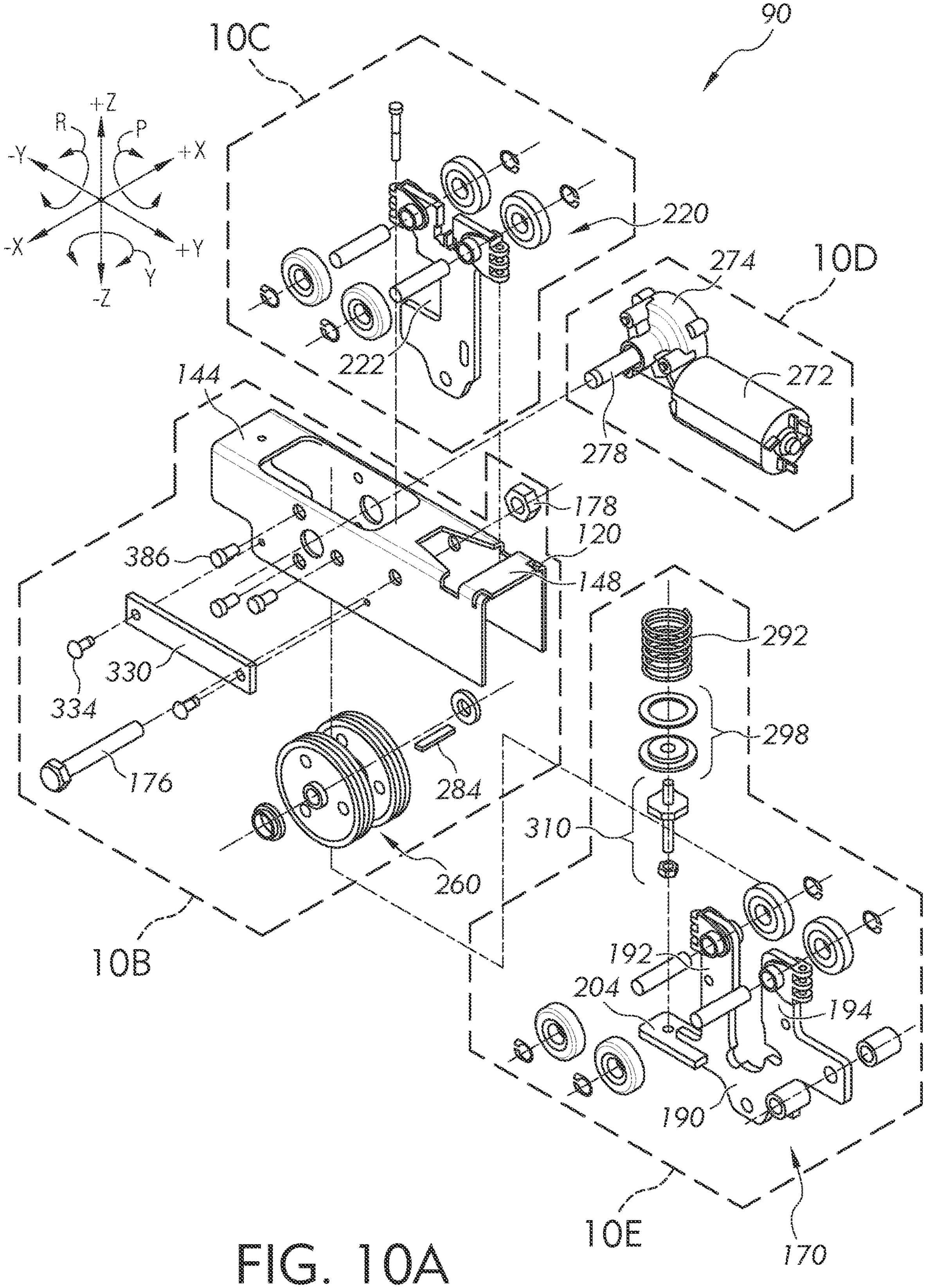
FIG. 10A is an exploded view of a transfer assembly (including sub-assemblies) according to one or more embodiments described in more detail herein.

The first frame includes a base 190, a first leg 192 extending vertically from the base and a second leg 194 also extending vertically from the base and longitudinally spaced from the first leg so that the first frame is approximately U-shaped. The variant of the first frame illustrated in FIGS. 12-13 also includes left and right frame links 198L, 198R, each of which is attached to the first and second legs 192, 194. The illustrated frame links resist any tendency for the legs to spread apart longitudinally, but may not be needed, as seen in the variant of FIG. 10A). The first frame also includes a first frame lug 200 with a first hole 202 extending laterally therethrough. (Hole 202 is referred to as "first" to distinguish it from a "second" hole in a second frame, described below.) The first frame also includes a platform 204, with a threaded hole 206 extending vertically therethrough.

The first frame also includes one or more first suspension wheels 92 rotatably affixed thereto for rotation about laterally extending axes 208. In the illustrated embodiment, the first suspension wheels include suspension wheels 92A and 92B, each of which is independently rotatable about axis 208AB, and suspension wheels 92C and 92D, each of which is independently rotatable about axis 208CD.

The first frame resides laterally between motor base flanges 122L, 122R. As seen best in FIG. 13, legs 192, 194 extend upwardly and vertically through motor base window 140. As seen best in FIG. 14, the first frame projects vertically downwardly through unobstructed space 150 so that hole 202 in first frame lug 200 is vertically lower than flange lower edges 152, 154.

Figure 15:
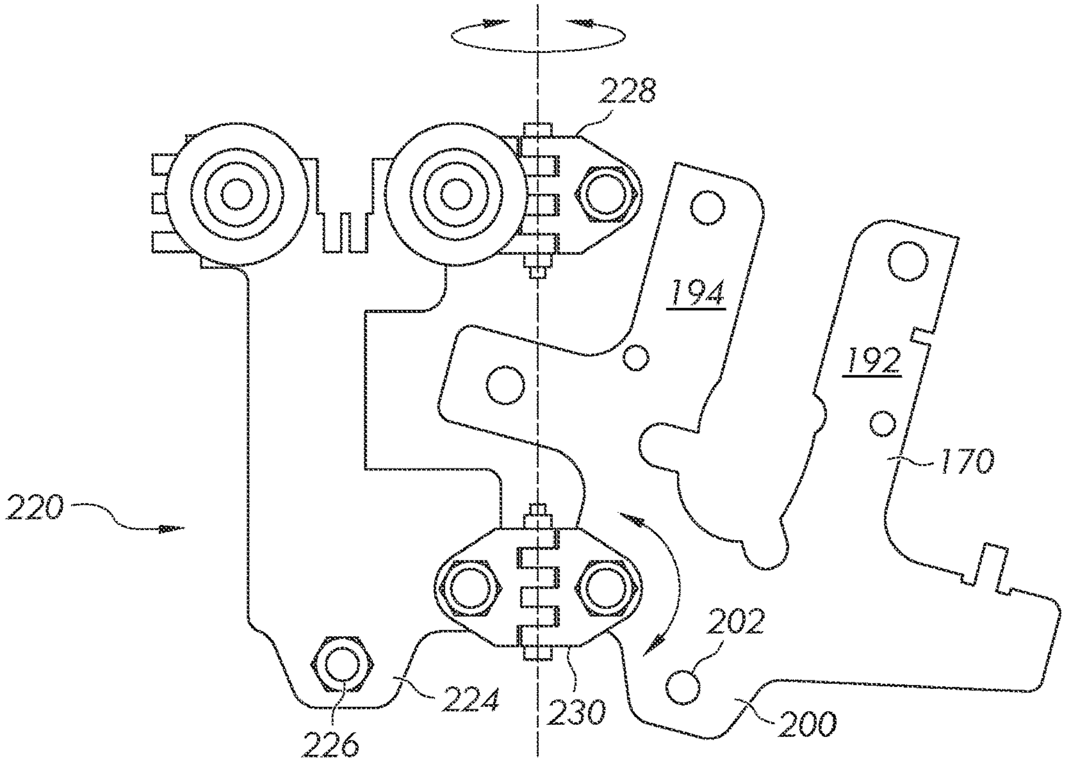
FIG. 15 is a view of the frames of FIG. 12 joined together by first and second hinges.

The transfer assembly also includes a second frame 220 with a slot 222 so that the second frame has an approximately C-shaped profile. A second frame lug 224 having a second hole 226 extending therethrough projects below the lower end of the second frame. (Hole 226 is referred to as "second" to distinguish it from the "first" hole 202 in first frame 170.) The second frame is not secured directly to motor base 120. Instead, the second frame is rotatably secured to first frame 170 by an upper hinge 228 so that the second frame is pivotable or rotatable relative to the first frame about a hinge axis or yaw axis $A_Y$. Therefore, the second frame is only indirectly connected to the first frame. Referring additionally to FIG. 15, a lower hinge 230 may also be provided, although, the lower hinge is believed to be optional.

The second frame includes one or more second suspension wheels rotatably affixed thereto for rotation about a laterally extending axis. In the illustrated embodiment, the second suspension wheels include suspension wheels 92E and 92F, each of which is independently rotatable about axis 208EF, and suspension wheels 92G and 92H, each of which is independently rotatable about axis 208GH.

Except for the possibility of some free play at hinge 228, second frame 220 is not rotatable about a pitch axis relative to first frame 170, only about the hinge/yaw axis $A_Y$. However, the second frame is co-rotatable with the first frame about pitch axis $A_P$ due to its connection to the first frame at hinge 228.

The second frame resides laterally between motor base flanges 122L, 122R. As seen best in FIG. 14, the second frame projects vertically downwardly through unobstructed space 150 so that hole 226 of second lug 224 is vertically lower than flange lower edges 152L, 152R.

Figure 16:
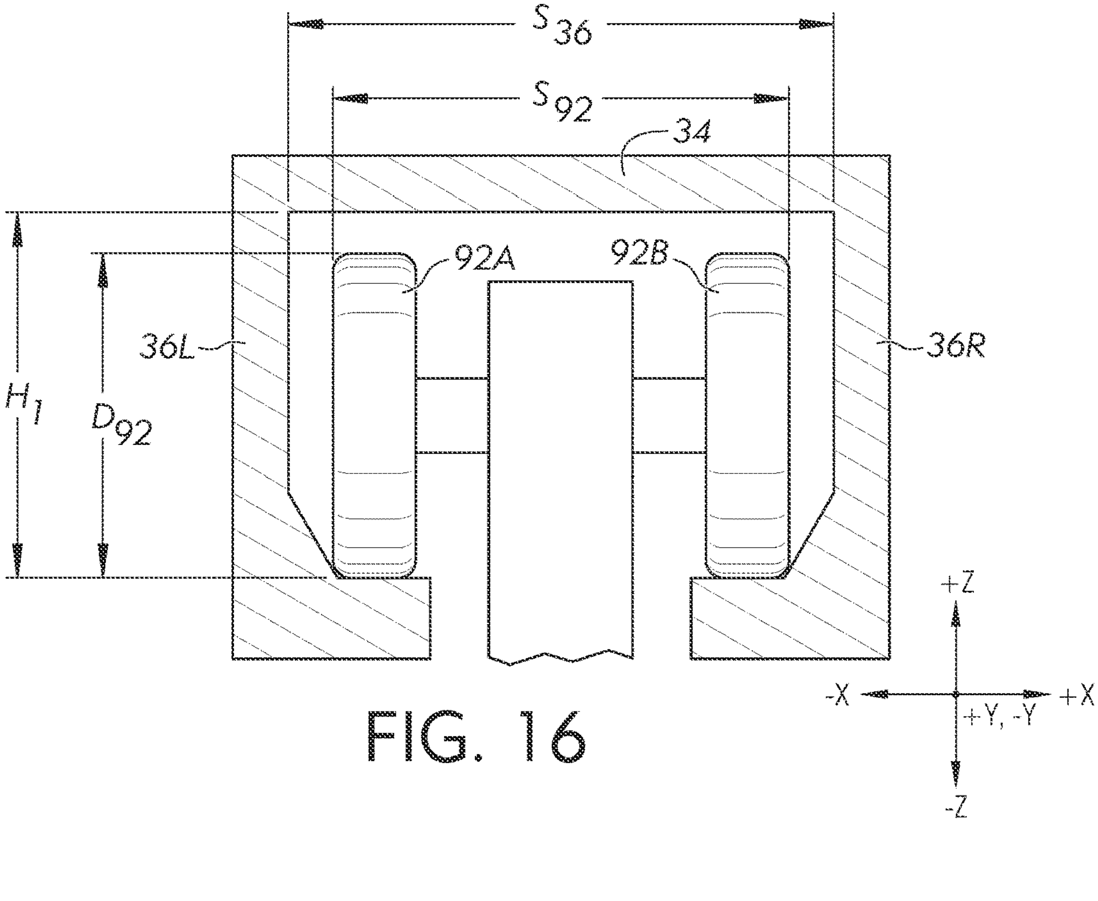
FIG. 16 is a schematic elevation view showing a rail of a rail network and showing suspension wheels of the transfer assembly engaged with a track portion of the rail according to one or more embodiments described herein.
Figure 17:
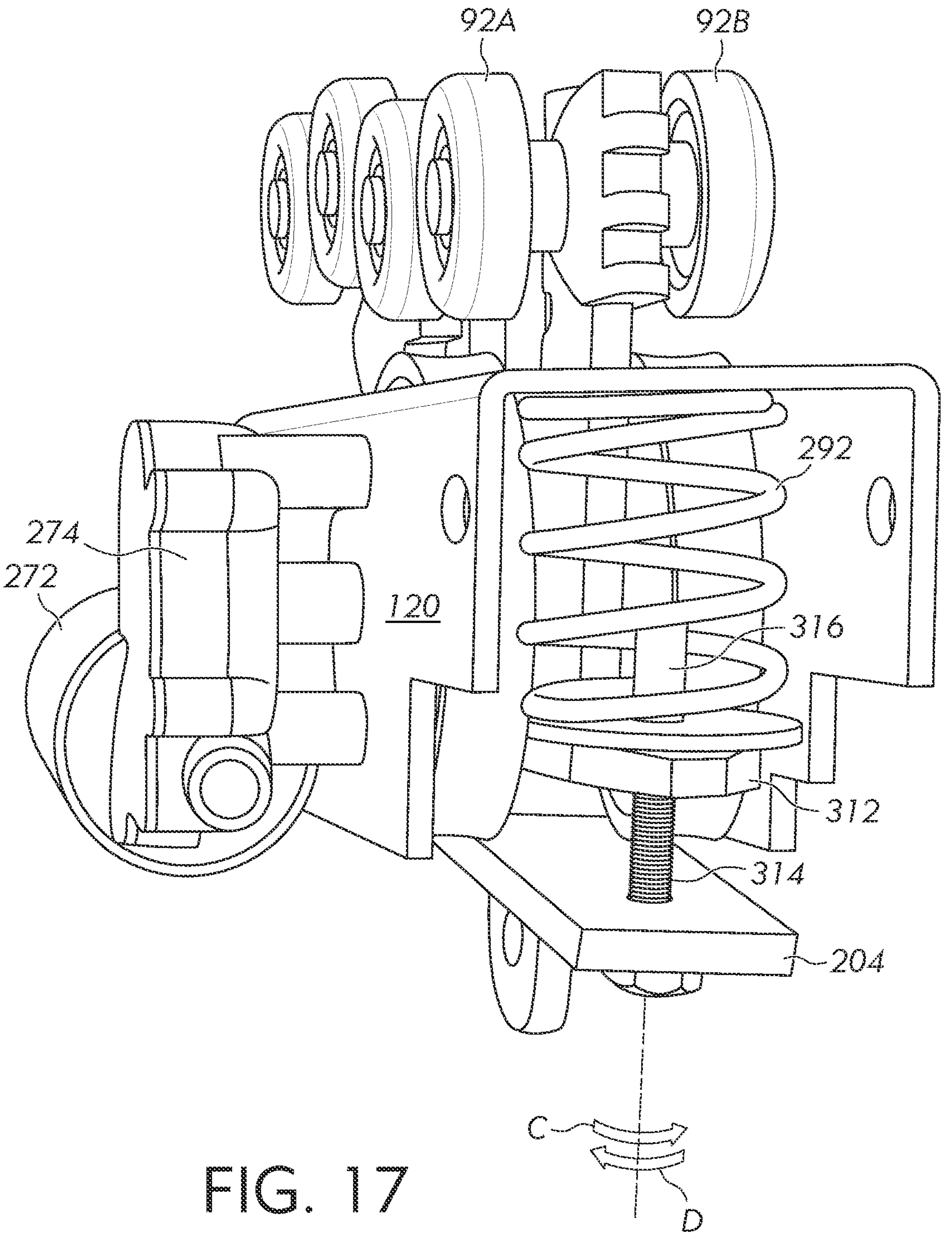
FIG. 17 is a view of an adjustment mechanism of the transfer assembly according to one or more embodiments described herein.

Referring to FIG. 16, the first suspension wheels 92A, 92B, 92C and 92D, and the second suspension wheels 92E, 92F, 92G and 92H are adapted to engage track 38, specifically the top 48T of the track (only wheels 92A and 92B are visible). Diameter $D_{92}$ of suspension wheels 92 is slightly less than the height $h_1$ of the space between the track 38 and rail cover 34. There is, therefore, vertical clearance to allow the wheels to roll. The span $S_{92}$ between the outboard surfaces of each pair of suspension wheels is slightly less than the lateral spacing $S_{36}$ of the left and right sidewalls 36L, 36R of the rail. There is, therefore, horizontal clearance to prevent the wheels from binding against the sidewalls as they travel along a curved section of rail, such as sections 32E of FIGS. 6-7.

First frame 170 includes at least one connection site for connecting a hoist thereto. In the illustrated embodiment, the connection site of the first frame is the first hole 202 extending through the first frame lug 200. Second frame 220 also includes at least one connection site to which a hoist may be connected. In the illustrated embodiment, the connection site of the second frame is the second hole 226 extending through second frame lug 224. Taken collectively, the first and second frames include at least two connection sites (such as first and second holes 202, 226) distributed between them. Referring back to FIG. 3, hoist 70 includes a first pair of hoist lugs 240 with first mounting holes 242 extending laterally therethrough and a second pair of hoist lugs 246 with second mounting holes 248 extending therethrough. The hoist and the transfer assembly are connected to each other by aligning the first frame hole 202 with the first mounting holes 242 and aligning the second hole 226 with the second mounting holes 248 such that the frame lugs 200, 224 are laterally between the first and second pairs 240, 246 of hoist lugs, and installing a connector, such as a bolt, through each group of aligned holes.

The transfer assembly also includes a drive wheel assembly 260 residing laterally between flanges 122L, 122R, of motor base 120. In the illustrated embodiment, the drive wheel assembly includes left and right drive wheels 260L, 260R, connected to each other by an axle 262. Each wheel is a metal wheel having a hub with three circumferentially distributed openings 264. The wheel rim is a rubber-like friction ring 266. Legs 192, 194 of first frame 170 straddle axle 262. The drive wheel assembly is mounted on the motor base between flanges 122L, 122R so that the drive wheels and the axle are all co-rotatable about a laterally extending drive wheel rotational axis 268.

The transfer assembly also includes a motor assembly 270 secured to the motor base. The motor assembly includes an electric motor 272 and a transmission 274. The housing of the motor assembly includes three bosses 280 each having a threaded hole 282. Threaded holes 282 correspond to openings 126, 128 in the motor base flanges. Transmission output shaft 278 is secured in the bore of drive wheel axle 262 by a key 284. Therefore, the rotational axis of output shaft 278 is the same as the rotational axis 268 of the drive wheel assembly. The motor assembly is therefore operatively connected to the drive wheel assembly such that operation of the motor rotates the drive wheel assembly. In the illustrated embodiment, the transmission cannot be backdriven by the drive wheels.

Referring principally to FIGS. 10A-10E, 14 and 17, the transfer assembly also includes an adjustment mechanism 290. The components of the adjustment mechanism include an adjustable biasing element 292, illustrated as a spring 292, interposed vertically between first frame 170 and motor base 120, specifically between platform 204 and rib 144, and even more specifically between a washer assembly 298 and rib 144. The spring includes a fixed end 296, so named because it is welded, brazed, glued or otherwise secured to washer assembly 298. The spring also includes a free end 302. When the spring is in a neutral or natural state (neither compressed nor stretched, as in FIGS. 10A and 10E) it has a height $h_S$.

The adjustment mechanism also includes an adjustment post 310 circumscribed by biasing element 292. The adjustment post has a head 312 faceted to accept a wrench, a threaded shank 314 extending vertically downwardly from the head, and a shank extension 316 extending vertically above the head. The shank is threaded into threaded hole 206 in platform 204. Assuming the threads on the adjustment post and those of threaded hole 206 are right hand threads, rotation of the post in rotational sense C translates the post upwardly causing spring 292 to be increasingly compressed between rib 144 of the motor base and washer assembly 298. Rotation of the post in rotational sense D translates the post downwardly causing the spring to become increasingly decompressed (symbols C and D are chosen to correspond to Compression and Decompression). Depending on the spring's natural length $h_S$ relative to the vertical distance between washer assembly 298 and rib 144 of the motor base (which distance is set by how much shank 314 is threaded into threaded hole 206) the free end of the spring may not always be in contact with rib 144, in which case the spring assumes its natural length $h_S$.

Washer assembly 298 has a center hole 304 whose diameter exceeds that of shank extension 316 or is otherwise oversized relative to the shank extension. The washer circumscribes the shank extension but, because of its oversized center hole, is not constrained to rotate along with rotation of the post.

Figure 18:
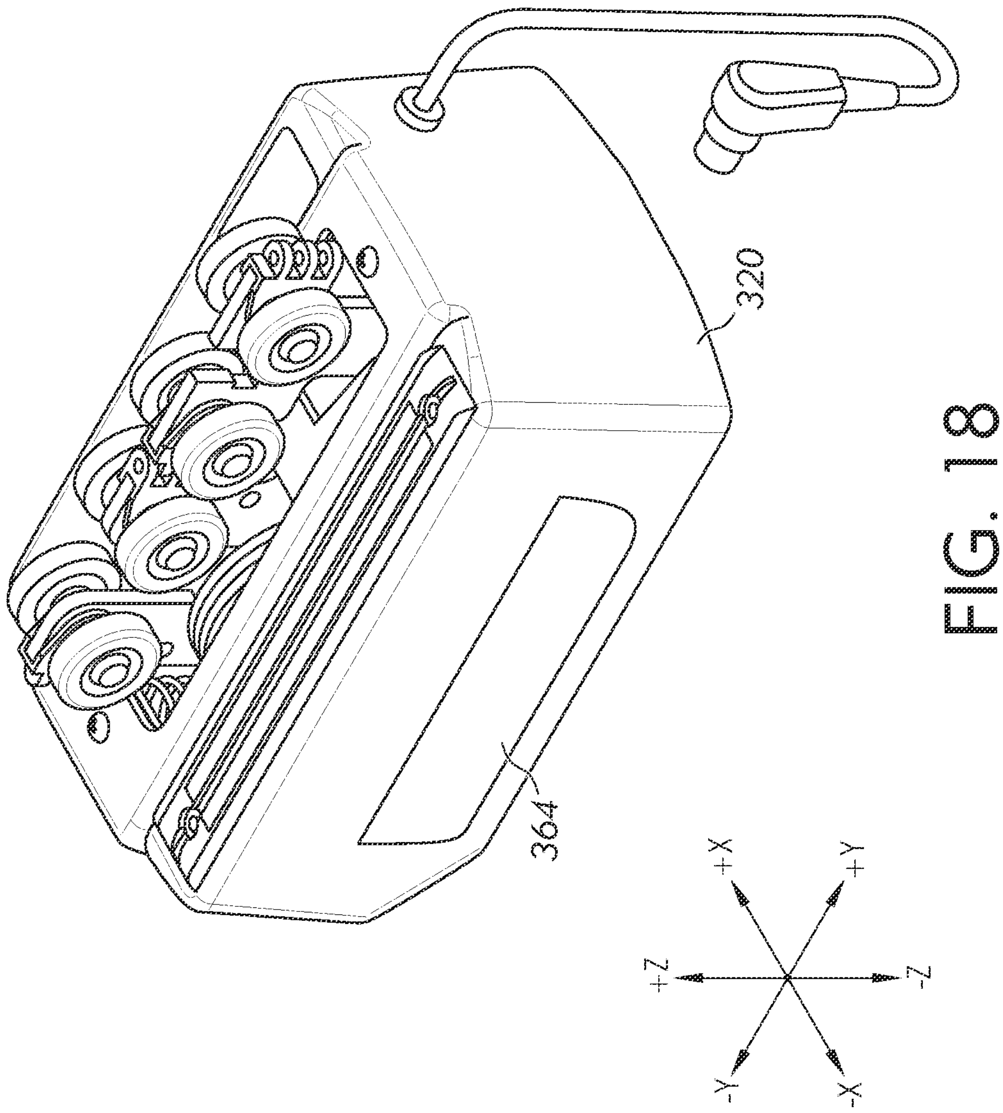
FIG. 18 is a view showing the transfer assembly installed inside the transfer assembly cover of FIG. 13.

Referring back to FIG. 13, and also referring to FIG. 18, transfer assembly 90 is installed inside a cover 320. The cover fits on top of the housing of the hoist and conceals the connection of hoist lugs 240, 246 to transfer unit lugs 200, 224.

Figure 19:
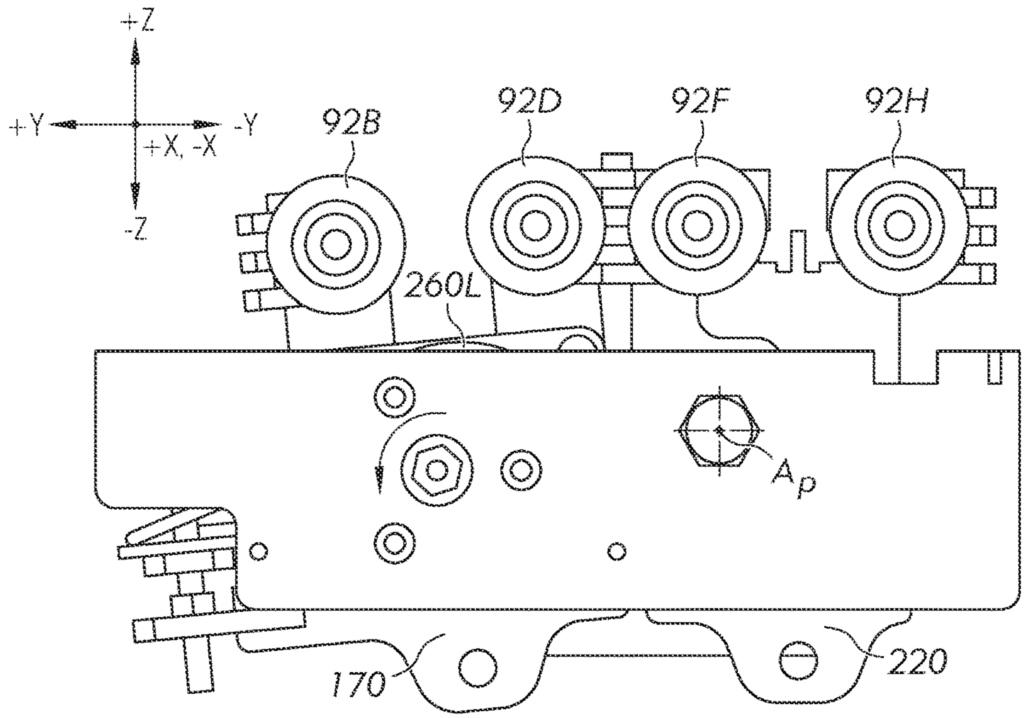
FIG. 19 is a view showing that when the transfer assembly is not installed on a rail of a lift and transport system, a first frame of the transfer assembly and a motor base of the transfer assembly can rotate relative to each other about a pitch axis.

Referring to FIG. 19, when the transfer assembly is not installed in a rail, first frame 170 is free to rotate about axis $A_P$ (i.e. relative to motor base 120) until the first frame, or some component attached to it, contacts some other component of the transfer assembly.

Referring to the sequence of views of FIGS. 20-22, installation of the transfer assembly into a rail will now be described.

Figure 20:
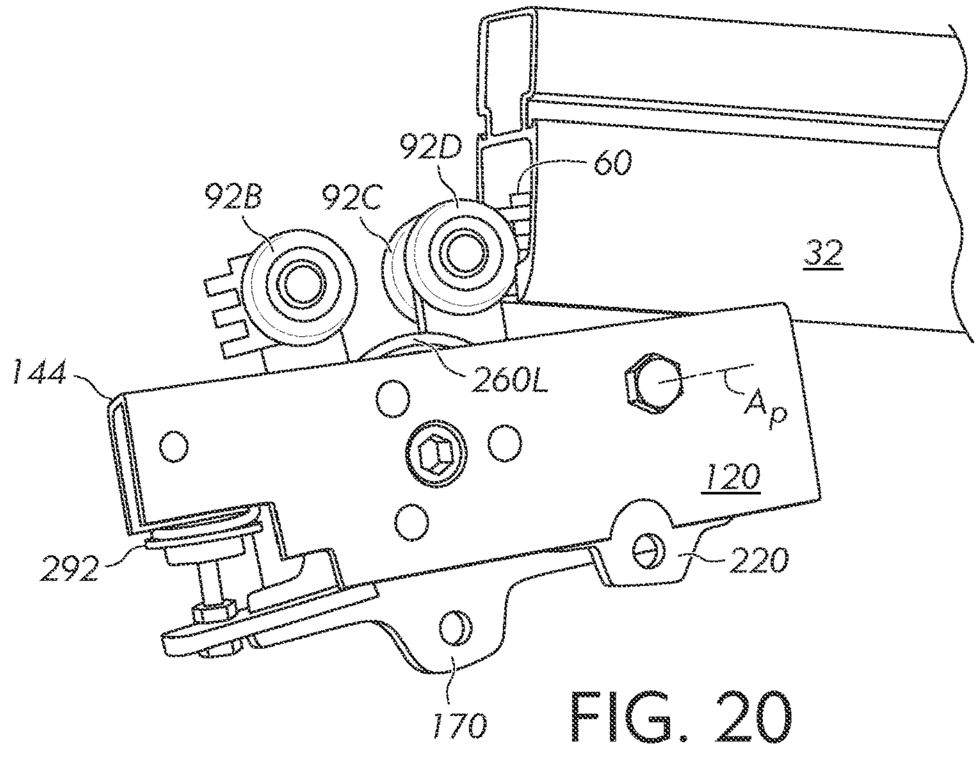
FIG. 20 is one view of a sequence of views showing installation of the transfer assembly onto a rail of the rail system.
Figure 21:
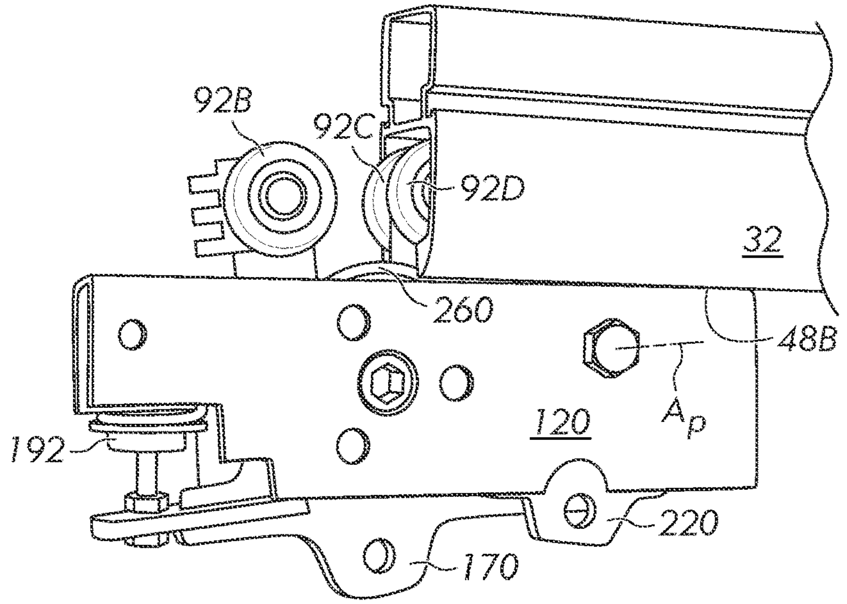
FIG. 21 is one view of a sequence of views showing installation of the transfer assembly onto a rail of the rail system.

A worker installs the transfer assembly in a rail by guiding suspension wheels 92G, 92H and 92E, 92F into the opening 60 at the open end of the rail (FIG. 20). At this stage of installation first frame 170 is still rotatable about axis $A_P$ as described above. As a result, unless the worker lifts up on the motor base, it will tend to dangle as seen in FIG. 20. Free end 302 of biasing element 292 is in contact with rib 144. However, the amount of spring compression is negligible. The relative rotation between the motor base and the first frame evident in FIG. 20 is referred to as a large-scale rotation to distinguish it from small-scale rotations, described below, that regulate traction between drive wheels 260 and rail 32.

As the worker continues to push the transfer assembly into the rail interior, suspension wheels 92C, 92D engage the rack, and drive wheels 260 arrive at a location such that they are at least partly longitudinally past rail opening 60 (FIG. 20). The drive wheels may or may not contact the bottom 48B of the track.

Figure 22:
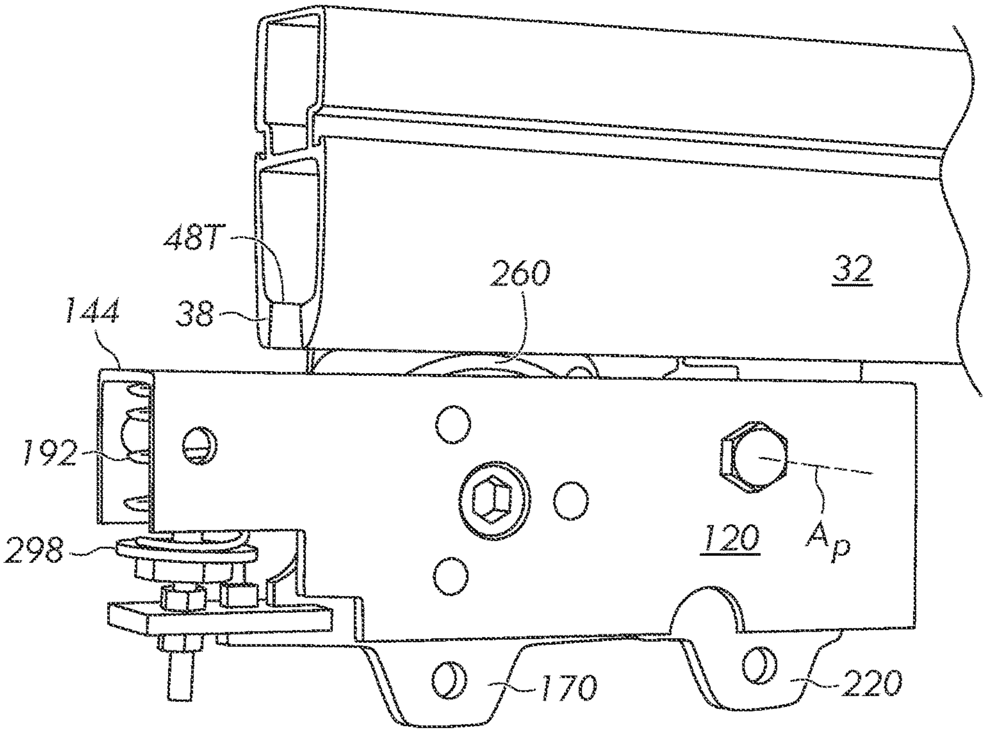
FIG. 22 is one view of a sequence of views showing installation of the transfer assembly onto a rail of the rail system.

The worker then guides suspension wheels 92A, 92B past opening 60 and onto track 38 (FIG. 22). Except for very small-scale rotations described below in connection with adjusting the traction of the drive wheels, relative rotation of first frame 170 and motor base 120 is now precluded. In other words, the angular orientation of the first frame relative to the motor base is substantially fixed. This is because the movement of wheels 92A, 92B onto track 38 (FIG. 21 vs. FIG. 20) requires that the first frame rotate up about axis $A_P$ (in order to raise wheels 92A, 92B to the same elevation as wheels 92C, 92D, 92E, 92F, 92G, 92H, i.e. to the elevation of the top 48T of the track). However upward rotation of the motor base is restricted by contact between drive wheels 260 (which are attached to the motor base) and the bottom 48B of the track. Spring 292 is therefore placed in a compressed state between rib 144 and washer assembly 298, and track 38 is squeezed between suspension wheels 92 and drive wheels 260.

It should be appreciated that the foregoing details of installation of the transfer assembly onto the rail depends on the initial, pre-installation state of the adjustment post, i.e. whether washer assembly 298 is closer to or further away from rib 144. For example with all eight suspension wheels engaged with the track as in FIG. 22, it is possible that the drive wheels might not be in contact with the bottom 48B of the track, although this lack of contact can and will be remedied by adjustment as described below. In another example, the drive wheels may be in contact once the stage of installation of FIG. 22 is achieved, but may or may not be in contact at the stage of installation of FIG. 21. However variation in the exact details does not affect the basic principle that once installation is complete, including the traction adjustment described below, relative rotation of the first frame and the motor base about axis $A_P$ is substantially precluded, and the track is gripped between the suspension wheels and the drive wheels.

It should also be appreciated that the installation worker can make use of adjustment post 310 during installation of the transfer assembly onto the rail. This may be especially helpful if, at the stage of installation shown in FIG. 21, the worker finds that the track is pinched so tightly between the suspension wheels and the drive wheels that it is difficult to continue the installation. Even if the worker applied enough force, the fact the drive wheels cannot backdrive the transmission means that the drive wheels will scrape along the bottom of the track rather than rolling along it. This may damage friction ring 266.

Once the transfer motor is installed as seen in FIG. 22, the worker can use the adjustment mechanism to regulate the amount of traction between the drive wheels and the bottom of the track. Because suspension wheels 92 are supported on the top of the track, platform 204 is a particular vertical distance away from the track. If the worker turns the adjustment post in rotational sense C seen in FIGS. 10A, 10E and 17, washer assembly 298 moves closer to rib 144, thereby compressing the spring and increasing the upwardly directed force that the spring exerts on rib. 144. This squeezes track 38 more tightly between the drive wheels and the suspension wheels thereby reducing the likelihood of wheel slippage during operation. Those skilled in the art will recognize that the above-described adjustment compresses the friction ring slightly due to a small-scale rotation of motor base 120 relative to first frame 170. This small-scale rotatability differs from the large-scale rotatability evident when the transfer assembly is not engaged with the rail (FIG. 19) and during the stages of assembly shown in FIGS. 20-22. The small-scale rotatability is limited by how much the material of the friction ring can be compressed radially.

If the worker turns the adjustment post in rotational sense D, washer assembly 298 moves vertically away from rib 144, thereby decompressing the spring and decreasing the upwardly directed force that the spring exerts on rib 144. This squeezes the track less tightly between the drive wheels and the suspension wheels, thereby reducing traction between the drive wheels and the bottom of the track. As with rotation of the adjustment post in rotational sense C, the above-described adjustment is accompanied by a small-scale rotation of motor base 120 relative to first frame 170.

In general, when the drive wheels contact the bottom of the track, and the biasing element contacts both the first frame (e.g. by contacting washer assembly 298) and the motor base, adjustment of the biasing element regulates compression of the biasing element, regulates compression of the drive wheel assembly against the bottom of the track, and regulates a clamping force exerted on the track by the suspension wheels and the drive wheel assembly.

Figure 13:
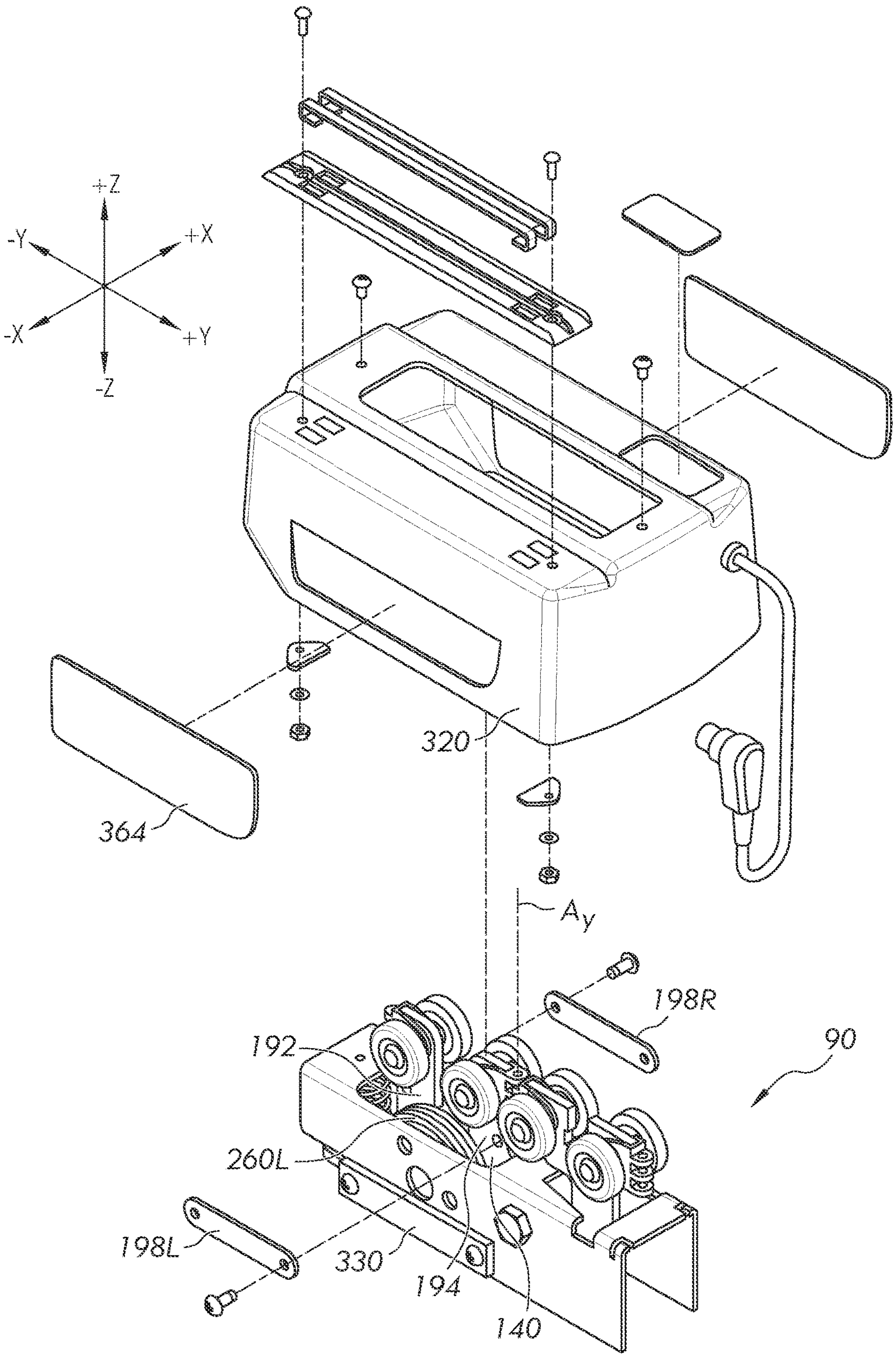
FIG. 13 is a view of the transfer assembly of FIG. 10A in an almost completely assembled state, and an exploded view of a transfer assembly cover.
Figure 14:
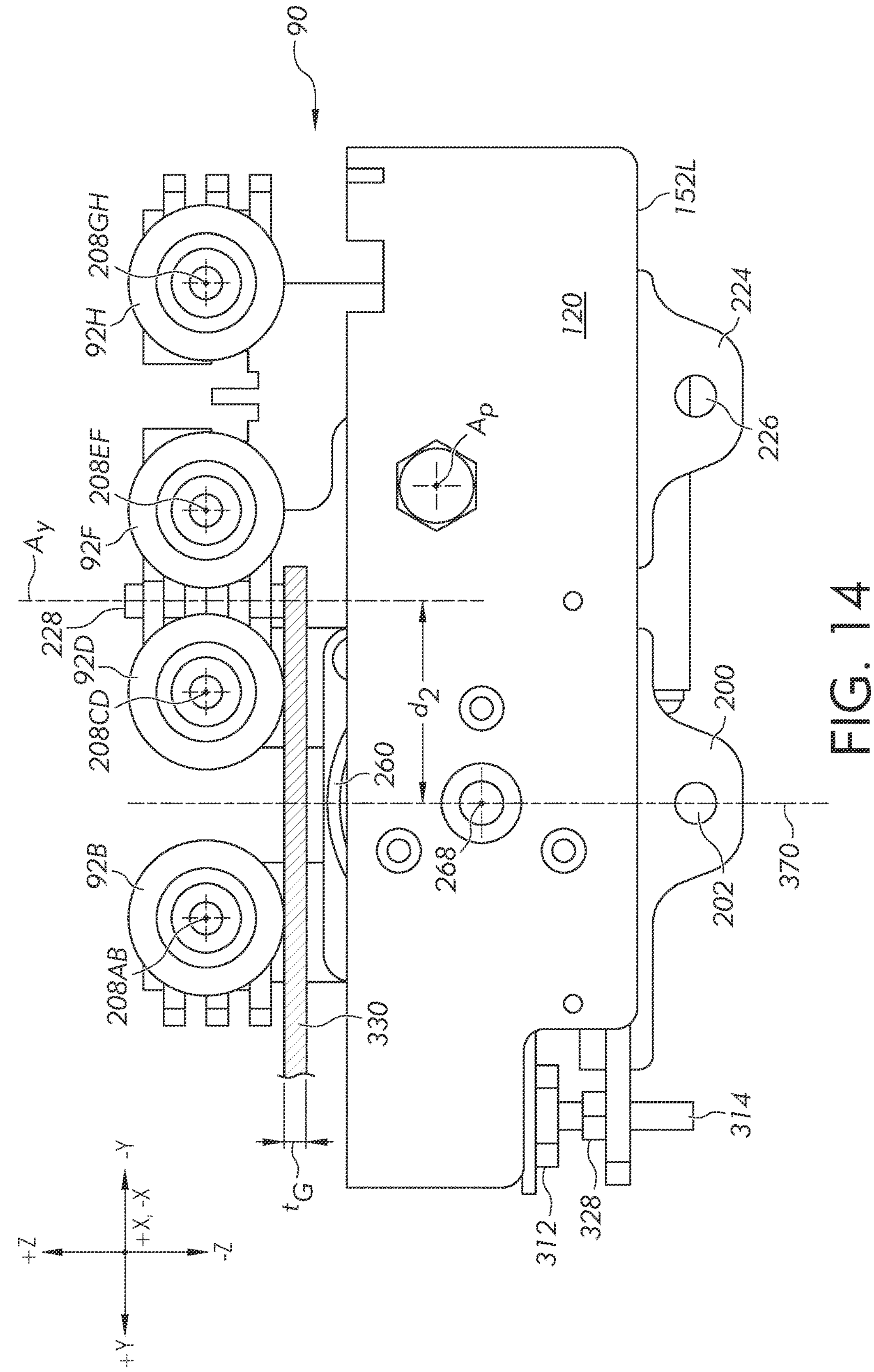
FIG. 14 is a side elevation view of the transfer assembly of FIG. 10A in an assembled state.

Referring to FIGS. 10A-10E, 13, 14, the illustrated transfer assembly also includes an adjustment gage 330 sized to reveal when adjustment of biasing element 292 by way of adjustment post 310 corresponds to a desired clamping force exerted on track 38 by suspension wheels 92 and drive wheels 260. The gage has a thickness to (FIG. 14) which is less than the thickness $t_T$ (FIG. 2) of track 38. Prior to installing the transfer assembly onto the rail, the worker inserts the gage between the drive wheels and the first suspension wheels as seen in FIG. 14. The worker then uses a wrench to turn adjustment post head 312 thereby threading shank 314 into or out of threaded hole 206 until suspension wheels 92A, 92B, 92C and 92D and drive wheel 260L, 260R just touch the gage. The thickness of the gage is calibrated, relative to the thickness of the rail, so that the desired post-installation clamping force exerted on the track by the suspension wheels and drive wheels will be achieved. The worker may tighten nut 328 to lock in the adjustment. The worker then removes the gage from between the suspension wheels and drive wheels, installs transfer assembly cover 320, and proceeds to install the transfer assembly onto the rail as described above. It is also the case that the adjustment can be made at the factory.

Figure 10B:
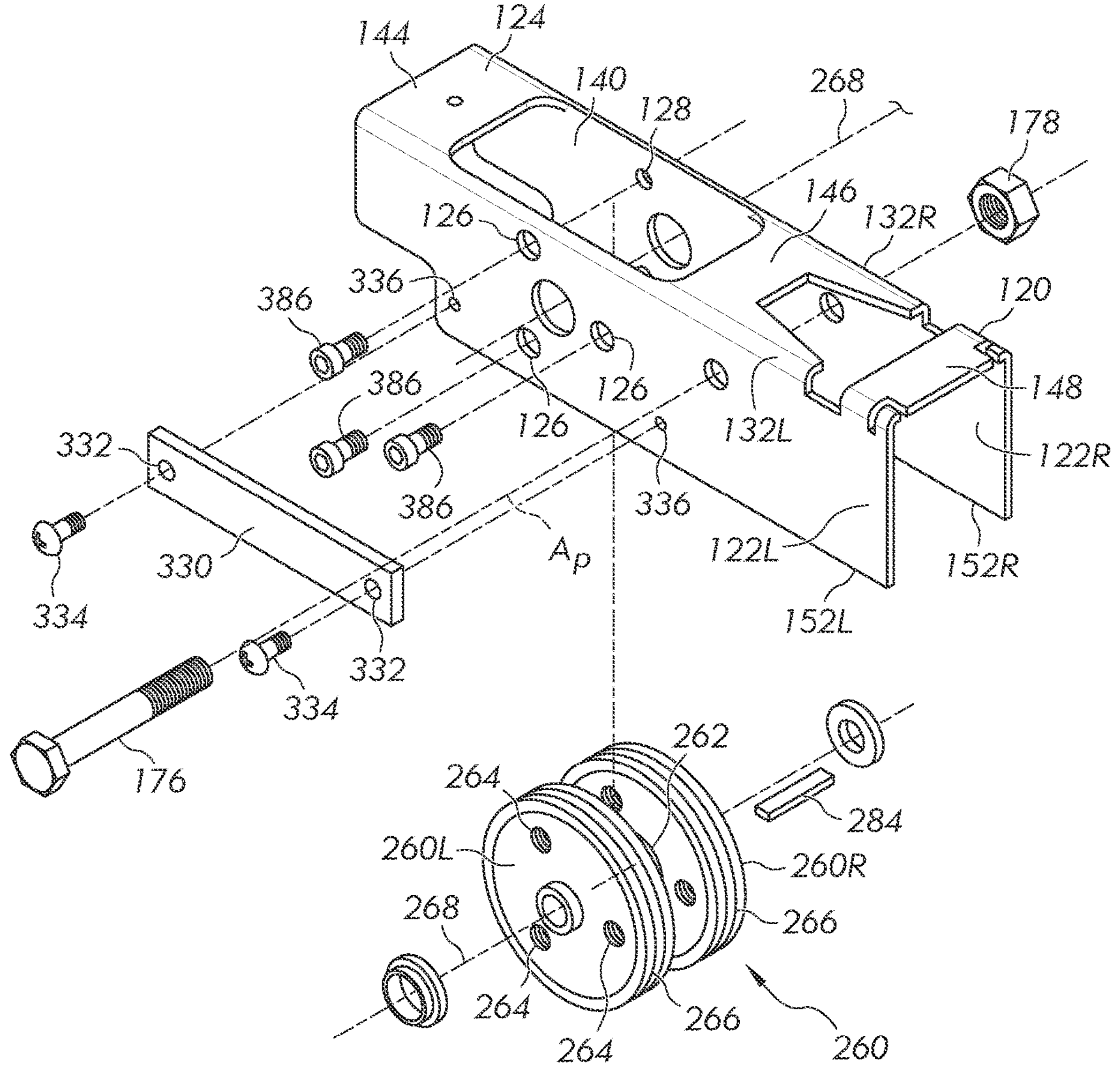
FIG. 10B is an exploded view of a sub-assembly of the transfer assembly of FIG. 10A.
Figure 10C:
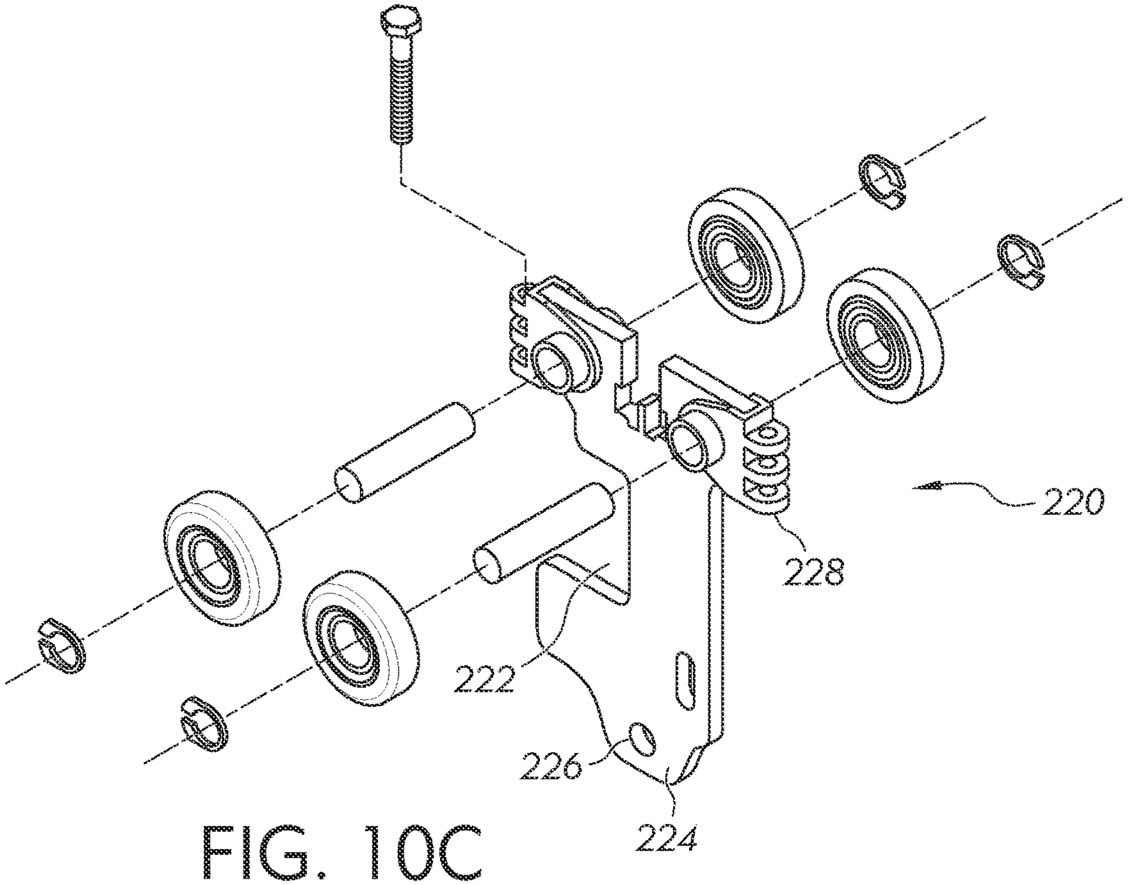
FIG. 10C is an exploded view of a sub-assembly of the transfer assembly of FIG. 10A.
Figure 10D:
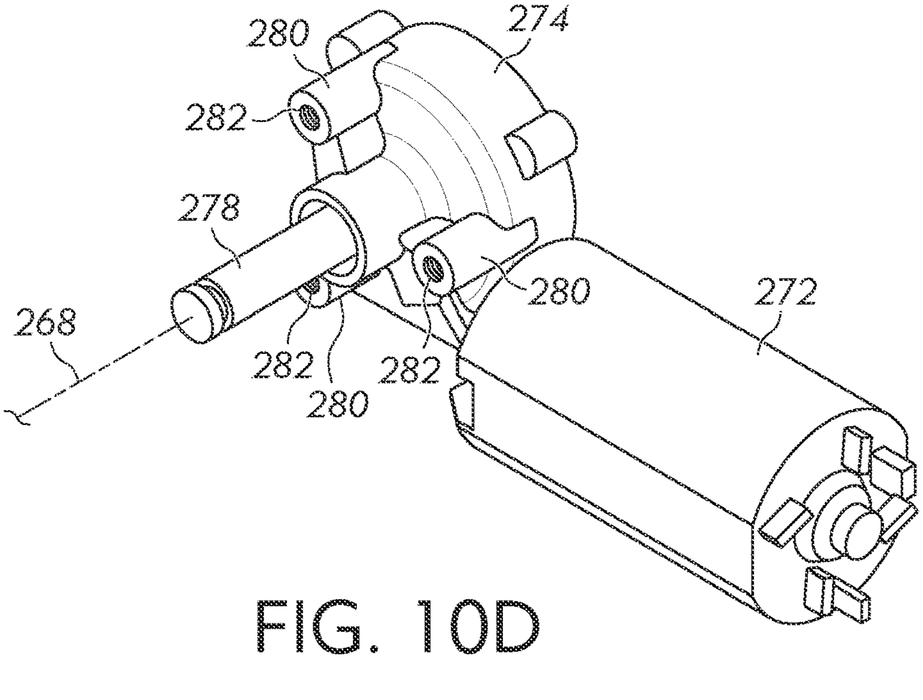
FIG. 10D is an exploded view of a sub-assembly of the transfer assembly of FIG. 10A.
Figure 10E:
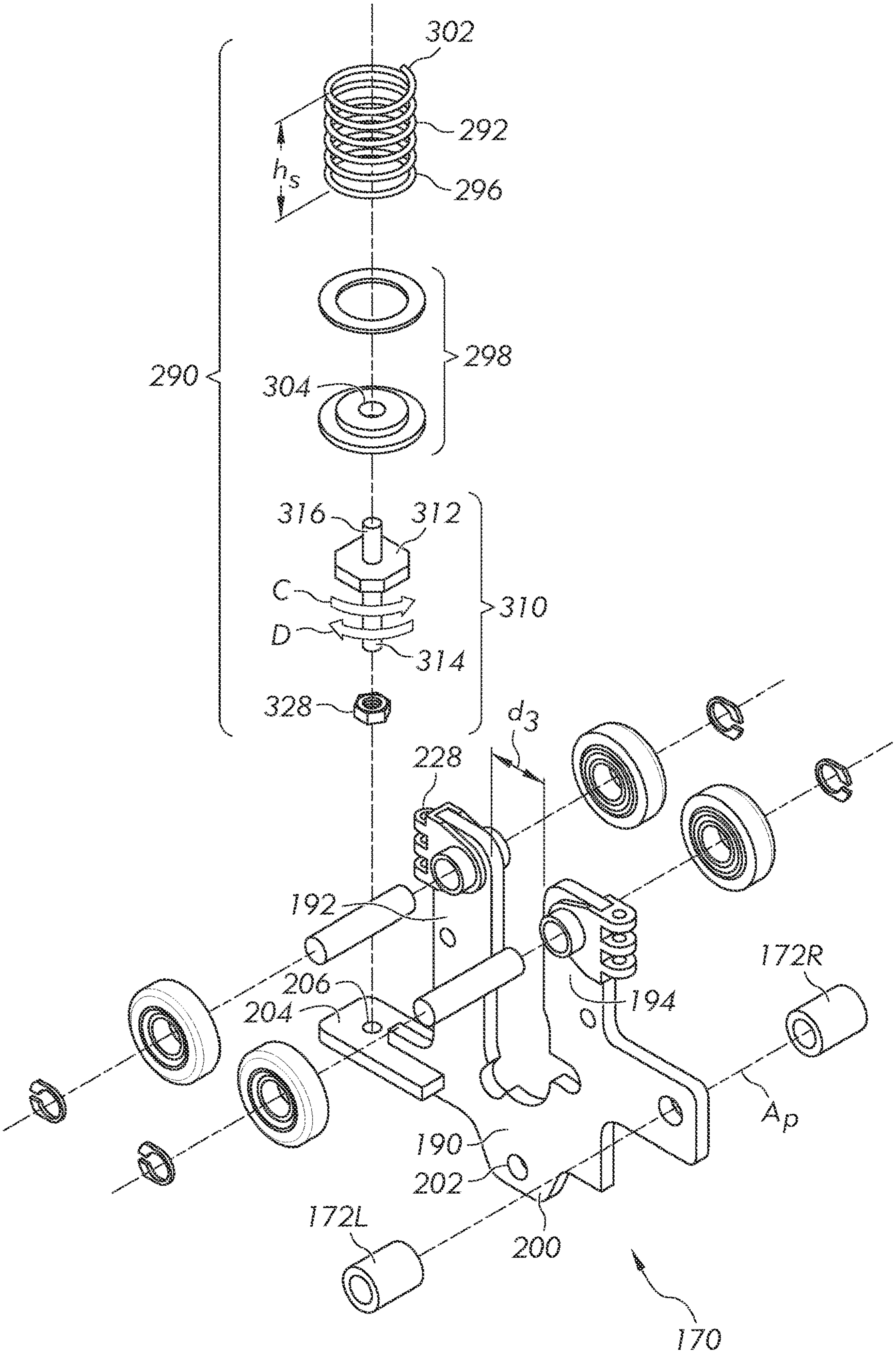
FIG. 10E is an exploded view of a sub-assembly of the transfer assembly of FIG. 10A.
Figure 11:
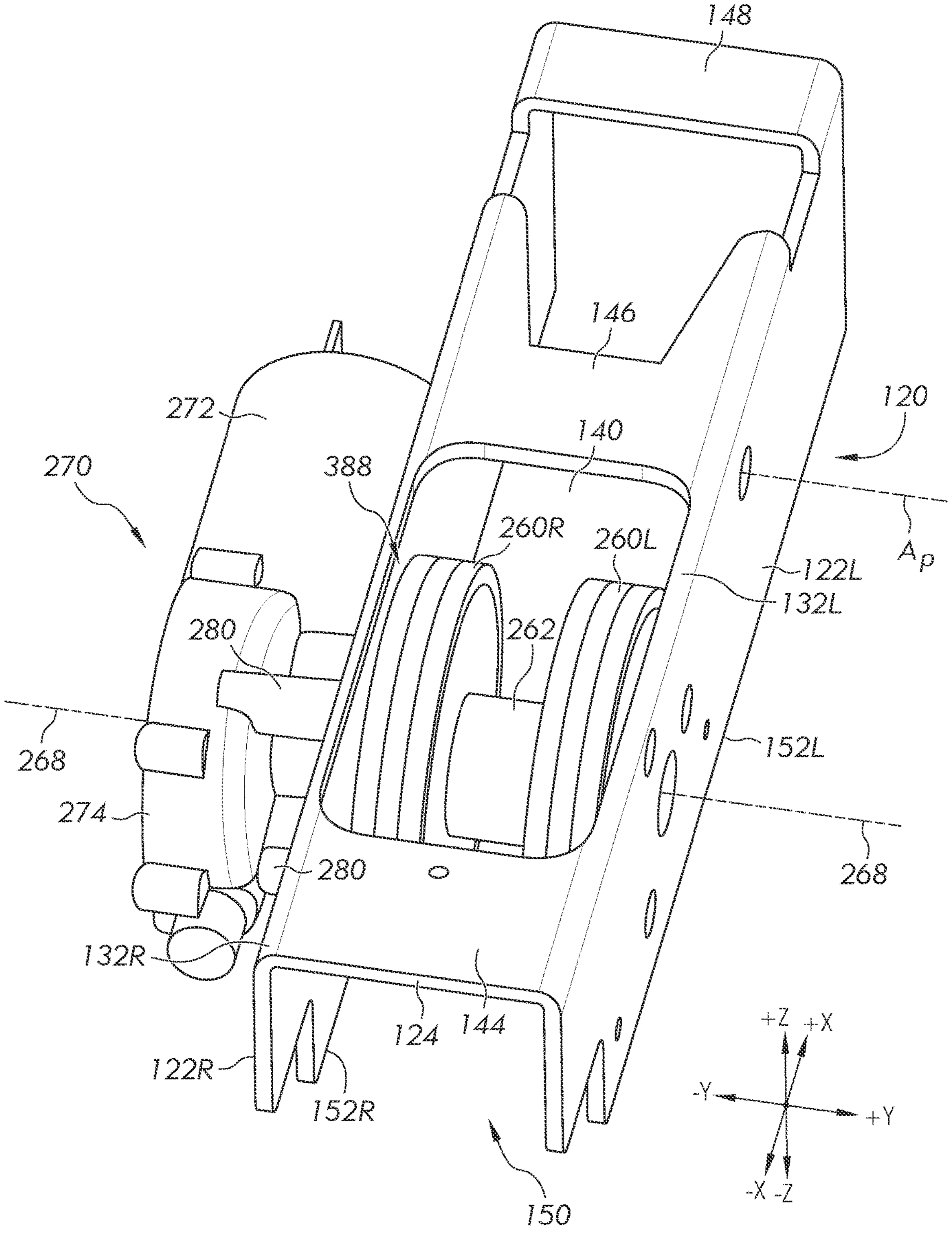
FIG. 11 is a view of a motor base, motor assembly, and drive wheel assembly of the transfer assembly of FIG. 10A.
Figure 12:
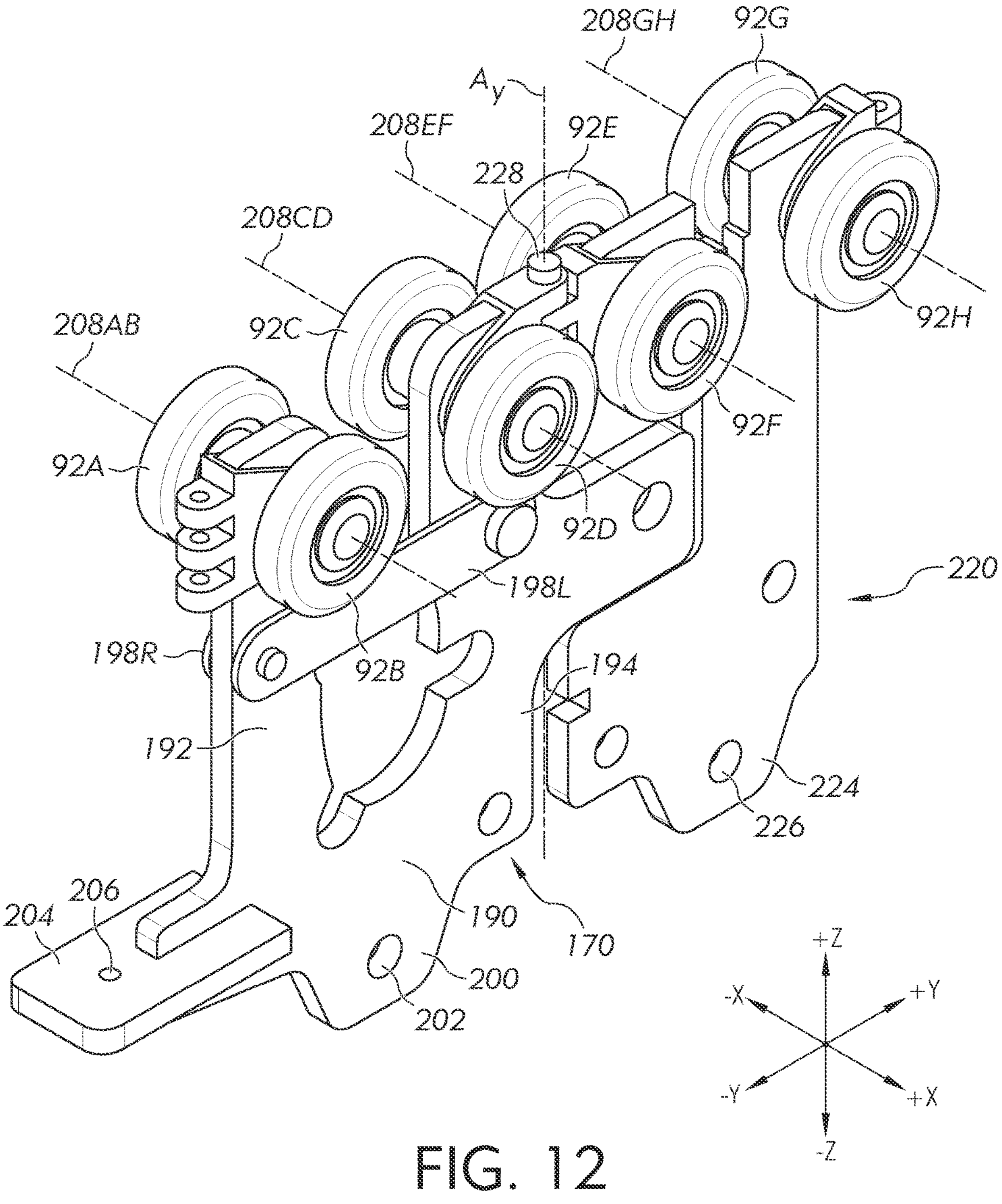
FIG. 12 is a view of a first frame and a second frame of the transfer assembly of FIG. 10A, the frames being joined together by a first hinge.

The gage is stowable on-board the transfer assembly. As seen in FIGS. 10A and 10B, the gage includes two holes 332. When the gage is not in use, a screw 334 is inserted through each hole 332 and threaded into a hole 336 on one flank of the motor base to secure the gage to the motor base. FIG. 13 shows gage 33 secured to motor base 120.

The above described traction adjustment by way of adjustment mechanism 290 can be carried out by the manufacturer prior to shipping the product rather than by an installation worker. Adjustment gage 330 may nevertheless be secured to the motor base so that the gage is readily available if a service technician is called upon to carry out repair or service that requires a subsequent adjustment and calibration of the adjustment by use of the gage.

Referring to FIGS. 23-24, a user interface in the form of a portable remote control unit 340 may be provided so that a user can operate the transfer motor. The remote control unit of FIGS. 22-23 includes UP and DOWN buttons 342, 344 (or directional control elements) which a user presses and holds to operate the hoist motor. The remote control unit also includes buttons 346, 348 (or directional control elements) which a user presses and holds to operate the transfer motor. Use of UP button 342 operates the hoist motor in a first rotational sense to lift a patient. Use of DOWN button 344 operates the hoist motor in a second, opposite rotational sense to lower the patient.

Figure 23A:
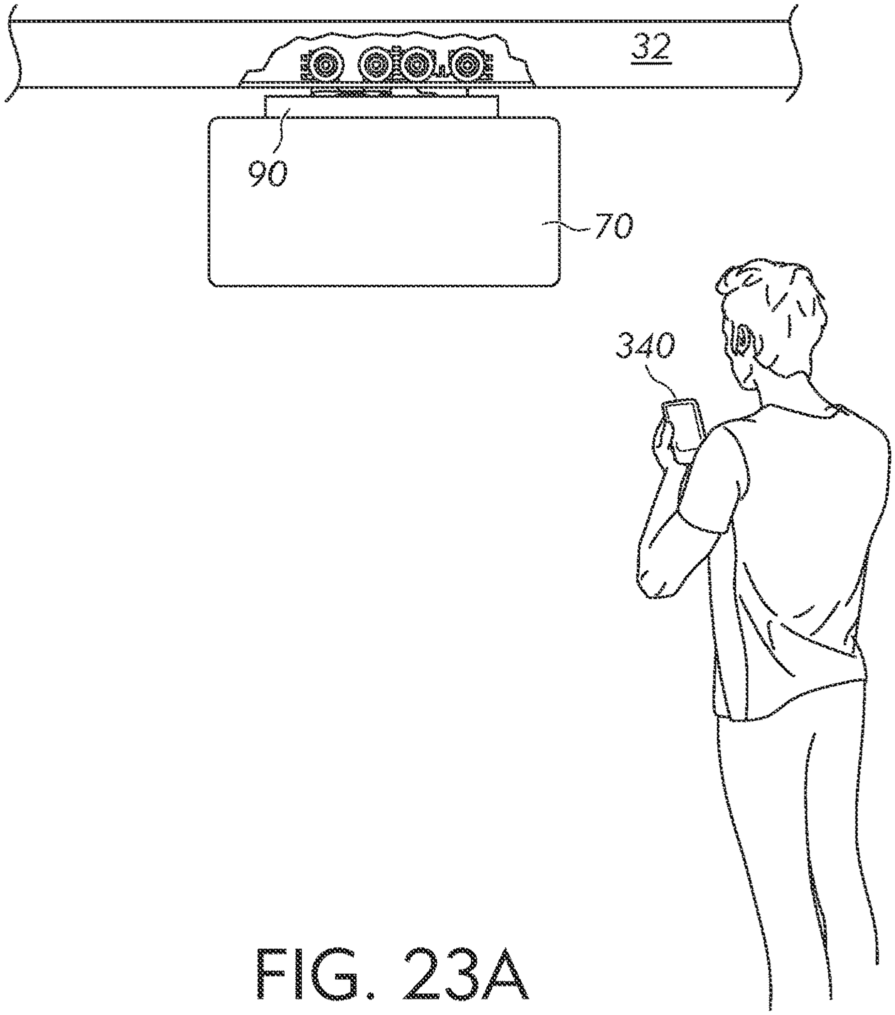
FIG. 23A (taken with FIG. 23B) is a schematic view illustrating that user interface buttons of a remote control unit can cause user confusion depending on whether the user is positioned to one lateral side or the other of a hoist suspended from an overhead rail system.
Figure 23B:
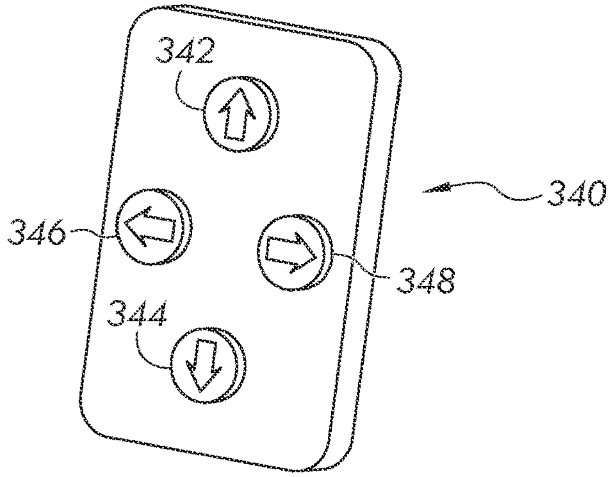
FIG. 23B schematically depicts a conventional remote control unit.
Figure 24A:
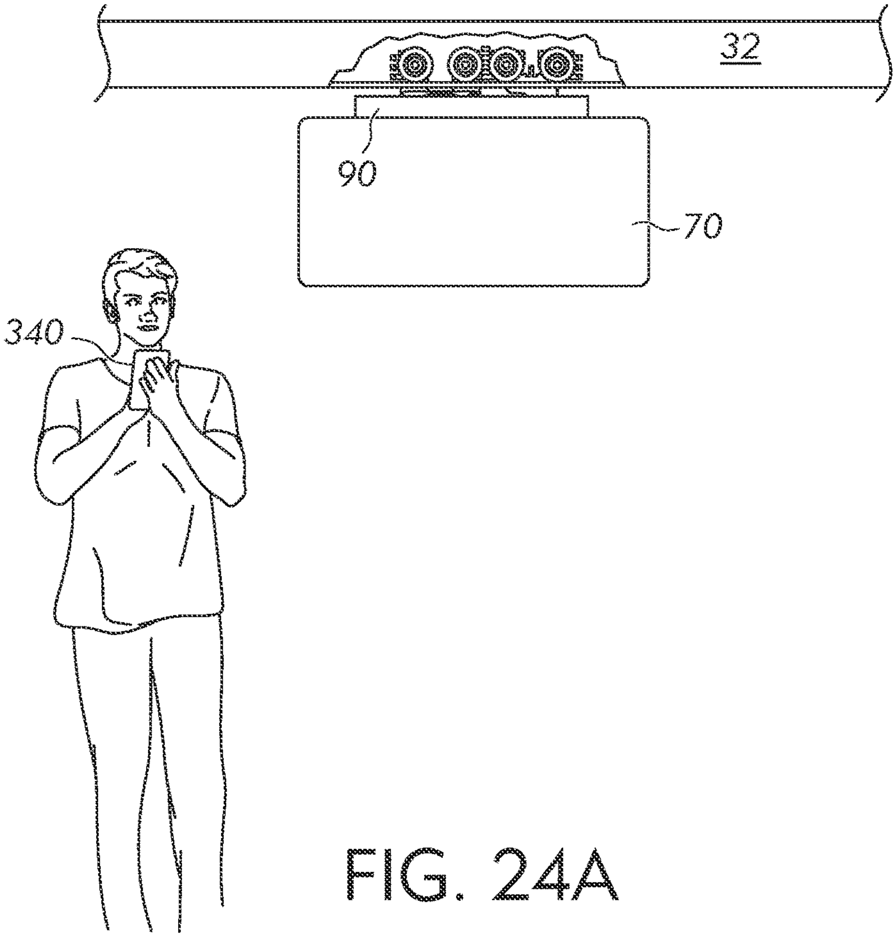
FIG. 24A (taken with FIG. 24B) is a schematic view illustrating that user interface buttons of a remote control unit can cause user confusion depending on whether the user is positioned to one lateral side or the other of a hoist suspended from an overhead rail system.
Figure 24B:
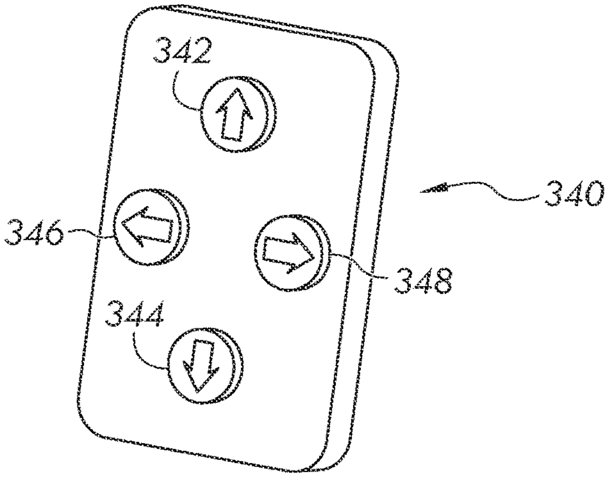
FIG. 24B schematically depicts a conventional remote control unit.

FIG. 23A shows the user standing to the west side of the suspended hoist, looking east, using a remote control device 340 having arrows on buttons 342, 344 as shown in FIG. 23B. FIG. 24A shows the user standing to the east side of the suspended hoist, looking west using a remote control device 340 having arrows on buttons 342, 344 as shown in FIG. 24B (the same as the remote control in FIG. 23B). As seen by comparing FIGS. 23A-23B and 24A-24B, the meanings of the arrows on buttons 342, 344 are unambiguous irrespective of whether the user is to the left of the hoist or to the right of the hoist.

However, transfer motor buttons 346, 348 are not unambiguous. If a user is positioned as seen in FIG. 23A (on the west side of the hoist looking east) use of button 346 operates the transfer motor in a first rotational sense causing the transfer assembly to propel itself and the hoist in a direction indicated in the drawing as "north". Use of button 348 operates the transfer motor in a second, opposite rotational sense causing the transfer assembly to propel itself and the hoist in a direction indicated in the drawing as "south". The buttons on the control unit correspond intuitively to the travel direction of the transfer motor and hoist. That is, left hand button 346 corresponds to leftward (northward) travel and right hand button 348 corresponds to rightward (southward) travel.

If the user moves to the east side of the hoist, looking west, as seen in FIG. 24A, the orientation of the remote control is reversed, essentially rotated 180 degrees about a vertical axis. Use of left hand button 346 still causes the hoist to travel to the north, however north is to the right while button 346 is to the left. Similarly, use of right hand button 348 still causes the hoist to travel to the south, however south is to the left and button 348 is to the right. This reversed orientation of buttons 346, 348 in comparison to the travel directions is counterintuitive and will likely cause confusion and frustration on the part of the user.

Figure 25A:
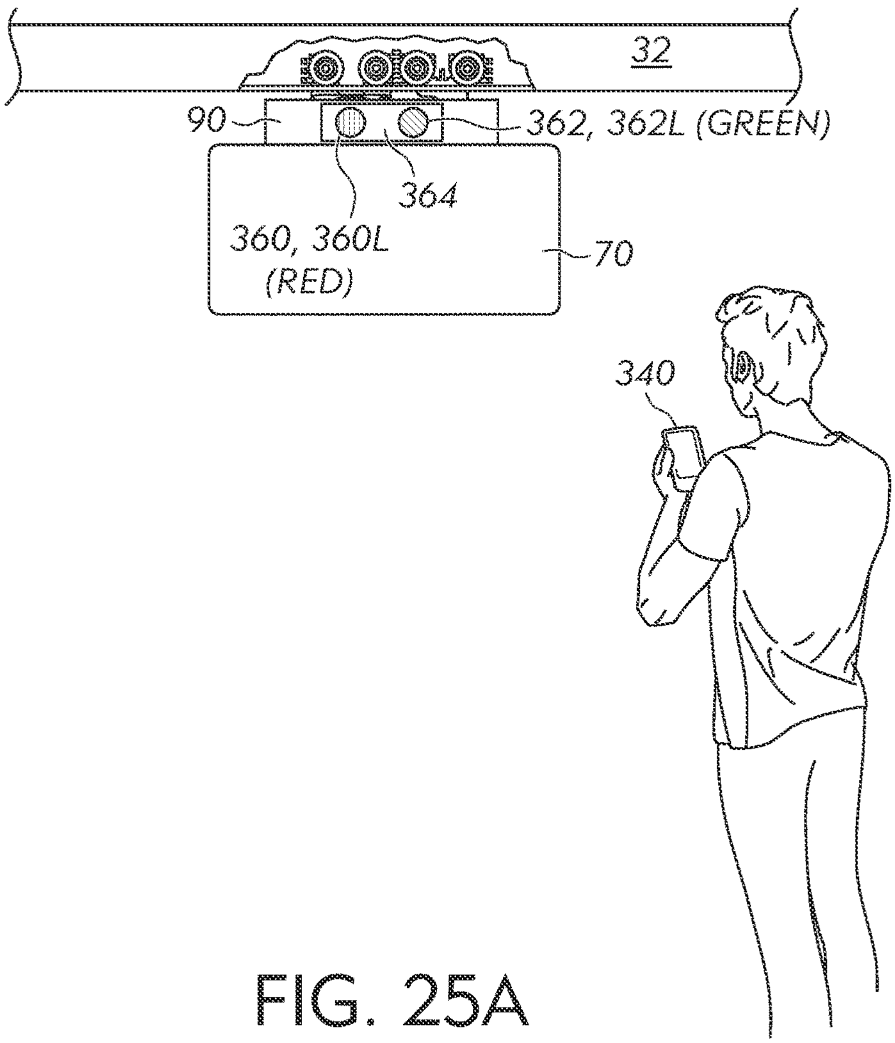
FIG. 25A is a view similar to those of FIGS. 23A and 24A showing directional notifiers on the cover of the transfer assembly, and user interface buttons coded to correspond to the directional notifiers in order to address the problem mentioned in connection with FIGS. 23A-24B.
Figure 25B:
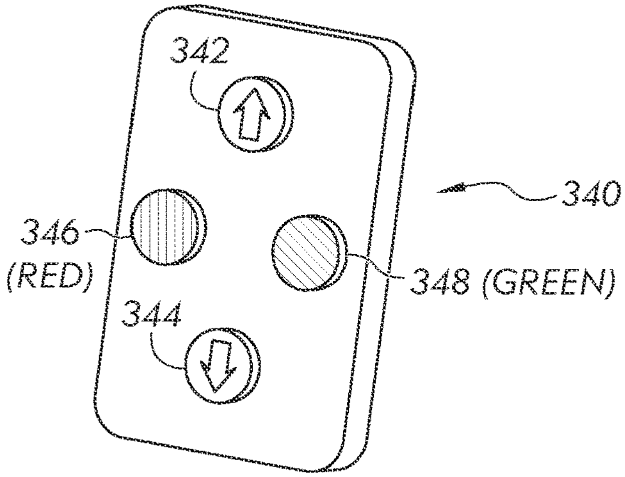
FIG. 25B is a view similar to those of FIGS. 23B and 24B showing a remote control unit with user interface buttons coded to correspond to the directional notifiers in order to address the problem mentioned in connection with FIGS. 23A-24B.

Referring to FIGS. 25A and 25B, the foregoing, difficulty is addressed by a north directional notifier 360 and a south directional notifier 362. When the user is to the west of the hoist looking east, as in FIG. 25A, the north directional notifier corresponds to a first directional control element of the user interface, e.g. button 346, and the south directional notifier corresponds to a second directional control element of the user interface, e.g. button 348. The north and south notifiers reveal the longitudinal direction in which the transfer assembly will be driven in response to actuation of the first and second directional controls respectively, irrespective of the orientation of the user interface.

In the illustrated embodiment the directional notifiers are differently colored circles, for example red (signified in the drawing by crosshatching in a first direction) and green (signified in the drawing by crosshatching in a second, different direction than the first). The left/right or north/south polarity of buttons 346, 348 corresponds to the direction of travel of the transfer motor and attached hoist. Use of left button 346 causes the transfer motor and attached hoist to travel to the left (northwardly). Use of right button 348 causes the transfer motor and attached hoist to travel to the right (southwardly). This is indicated clearly by the correspondence between the directional notifiers 360, 362 and the control elements 346, 348, specifically the colors of the notifiers and the matching colors of the control elements.

Figure 26A:
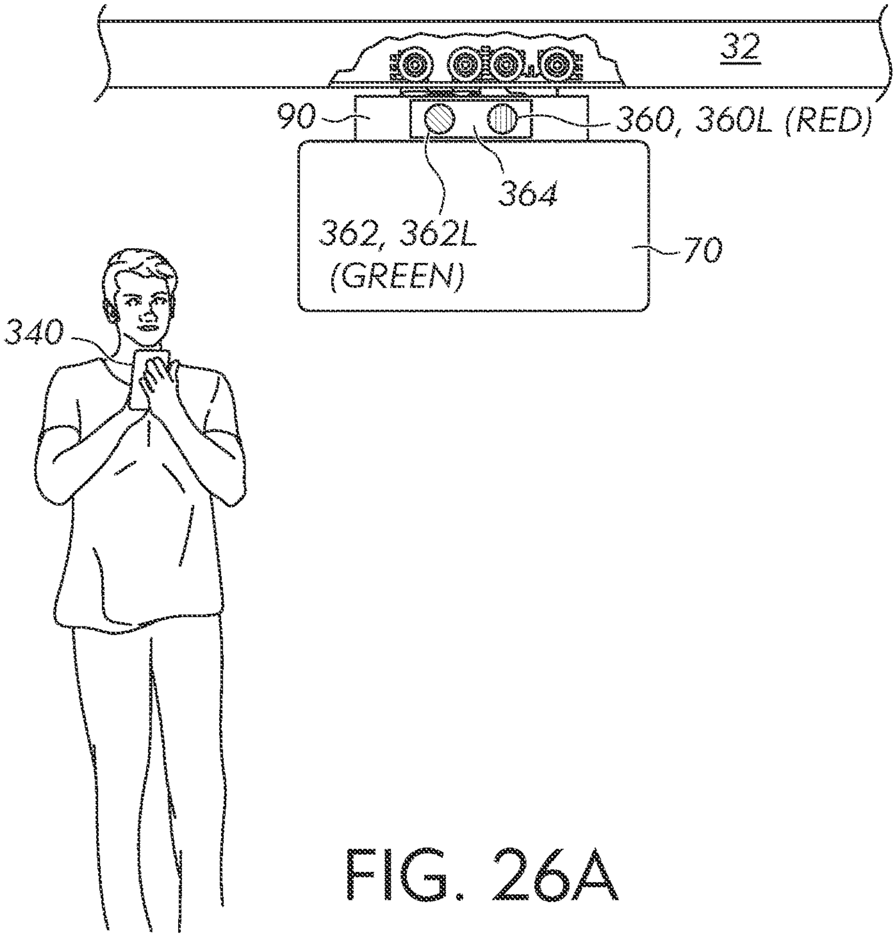
FIG. 26A is a view similar to those of FIGS. 23A and 24B showing directional notifiers on the cover of the transfer assembly, and user interface buttons coded to correspond to the directional notifiers in order to address the problem mentioned in connection with FIGS. 23A-24B.
Figure 26B:
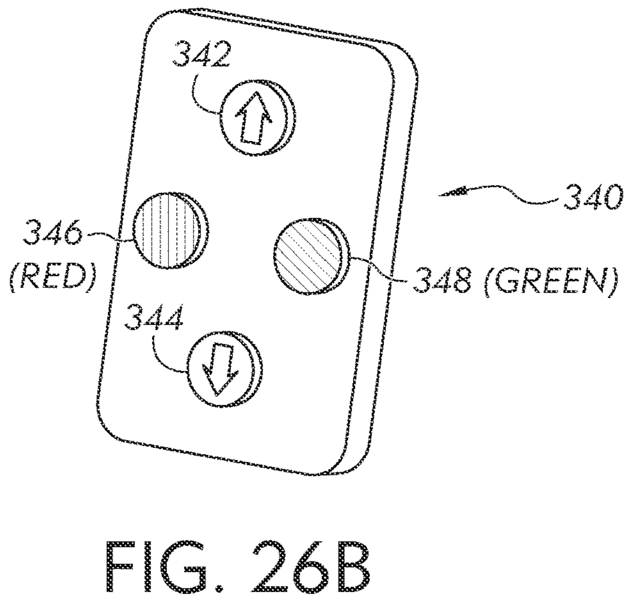
FIG. 26B is a view similar to those of FIGS. 23B and 24B showing a remote control unit with user interface buttons coded to correspond to the directional notifiers in order to address the problem mentioned in connection with FIGS. 23A-24B.

In FIG. 26A and FIG. 26B the user is to the east of the hoist looking west. Use of left button 346 causes the transfer motor and attached hoist to travel northwardly, as expected, but to the user's right, not to the user's left. Use of right button 348 causes the transfer motor and attached hoist to travel southwardly, as expected, but to the user's left, not to the user's right. Although the direction of travel is reversed relative to the spatial polarity of the buttons, the user is informed of which direction of travel to expect because of the color-coding of the directional notifiers and the corresponding color-coding on buttons 346, 348. As before, this is indicated clearly by the correspondence between the directional notifiers 360, 362 and the control elements 346, 348, specifically the colors of the notifiers and the matching colors of the control elements.

More specifically, the north directional notifier includes a left side north notifier 360L visible from a first lateral side of cover 320 and a right side north notifier 360R visible from a second lateral side of the cover. Both north notifiers correspond to first directional control element 346. The south directional notifier includes a left side south notifier 362L visible from the first lateral side of the cover and a right side south notifier 362R visible from the second lateral side of the cover. Both south notifiers correspond to the second directional control element 348. The left side and right side north notifiers reveal the longitudinal direction in which the transfer assembly will be driven in response to actuation of the first directional control and the left side and right side south notifiers reveal the longitudinal direction in which the transfer assembly will be driven in response to actuation of the second directional control respectively, irrespective of the orientation of the user interface.

Notifiers 360, 362 may be provided on a label 364 that is affixed to transfer assembly cover 320, or may be applied directly to the cover itself. Moreover, the directional notifier may be in a form other than color-coding.

In view of the foregoing, additional features of the transfer assembly can now be better appreciated.

Referring back to FIG. 14, when the transfer assembly is installed in a rail, pitch axis $A_P$ and plane 370, which is midway between suspension wheel axes 208AB, 208CD of first frame 170, are longitudinally spaced from each other by distance $d_2$. Pitch axis $A_P$ and drive wheel rotational axis 268 are longitudinally spaced from each other by the same distance $d_2$. Drive wheels 260 are therefore longitudinally midway between the suspension wheel axes 208AB, 208CD of the first frame.

The rails are affixed to the facility ceiling so that the track is horizontal. That is, there is substantially no change in track elevation as one moves along the length of the track. When a patient's weight is applied to the hoist strap, which weight is transferred to the rail by the first and second frames 170, 220, and the suspension wheels 92. The first hole 202 is longitudinally midway between suspension wheel axes 208AB and 208CD. The second hole 226 is longitudinally midway between suspension wheel axes 208EF and 208GH. As a result, the patient's weight is longitudinally uniformly distributed on the track. In addition, the net force resulting from the distributed forces is located longitudinally midway between longitudinally inboard suspension wheels.

The U-shape of first frame facilitates assembly of the transfer assembly components. Inter-leg spacing $d_3$ (shown in FIGS. 10A and 10E) is wider than the diameter of axle 262 (best seen in FIG. 11) of the drive wheel assembly. Therefore, after the drive wheel assembly has been installed between flanges 122L, 122R of the motor base, the first frame can be moved upwardly through unobstructed space 150, until legs 192, 194 straddle axle 262 and so that the legs extend vertically past the axle. This is in contrast to a previously designed transfer assembly for which it was necessary to install the drive wheel assembly after the frame had already been approximately positioned. This was more cumbersome than installing the frame after the drive wheel assembly is in place.

During assembly of the components, drive wheel assembly 260 is mounted to motor base 120. This is followed by mounting of the motor assembly 270 to flange 122R of motor base 120 using screws 386. Mounting of the motor involves installing the screws from the interior side of flange 122R, through openings 128 and into threaded holes 282 of threaded bosses 280. The screw heads are larger in diameter than the diameter of openings 128 and therefore when tightened bear against the inboard surface of flange 122R.

In a prior art design, openings 126 were of the same diameter as openings 128. Because the motor is installed after the drive wheels are already in place, assembly involved maneuvering each screw 386 into its opening 128, and threading it at least part way into the corresponding boss, by way of the narrow lateral space 388 (FIG. 11) between the outboard side of right drive wheel 260R and the inboard side of flange 122R. The screws would then be torqued to specification with an allen wrench inserted through openings 126. Openings 264 in the drive wheel hubs would have to be aligned with openings 126 and 128 to accommodate the allen wrench.

In the illustrated design, openings 126 are of larger diameter than that of the screw heads so that the screw heads can pass through openings 126. The screws are installed by inserting them through the oversized openings 126 in flange 122L, through pre-aligned hub openings 264, through openings 128, and into the threaded holes 282 of bosses 280. An allen wrench is used, as already described, to torque the screws to specification. The oversized openings 126 simplify attachment of the motor to flange 122R because they dispense with the need to maneuver each screw into openings 128 and threaded holes 282 by way of the narrow lateral space 388 between the outboard side of right drive wheel 260R and the inboard side of flange 122R.

The combined features of the disclosed transfer assembly combine synergistically to address the shortcomings of pre-existing transfer assemblies. The motor assembly reduces workload on caregivers. The regulation of traction obtained by way of the adjustability of the biasing element reduces the likelihood of slippage that may result from accumulated production tolerance and/or using the device for a particularly heavy patient. The elongated character of the transfer assembly allows it to safely cross a coupler of a rail system by distributing the weight applied to the hoist strap thereby ensuring that the coupler itself is not exposed to the entirety of that weight. The elongated character of the transfer assembly also causes it to be better able to overcome track deformities. The yaw capability provided between the first and second frames enables the transfer assembly to roll around curved track sections despite its elongated character.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A transfer assembly for a hoist unit comprising:

a motor base;

a first frame secured to the motor base for rotation about a pitch axis, the first frame including one or more first suspension wheels rotatably affixed thereto for rotation about a laterally extending axis;

a second frame secured to the first frame for rotation about a yaw axis, the second frame including one or more second suspension wheels each of which is rotatably affixed thereto for rotation about a laterally extending axis;

a drive wheel assembly which includes one or more drive wheels each of which is rotatably mounted on the motor base for rotation about a laterally extending drive wheel axis; and a motor assembly secured to the motor base and operatively connected to the drive wheel assembly such that operation of the motor assembly rotates the drive wheel assembly.

2. The transfer assembly of claim 1 including an adjustable biasing element interposed between the first frame and the motor base.

3. The transfer assembly of claim 2, wherein the one or more first suspension wheels and the one or more second suspension wheels are adapted to engage a track having a top and a bottom and wherein adjustment of the adjustable biasing element regulates how much the adjustable biasing element is compressed when the one or more drive wheels are in contact with the bottom of the track, and the adjustable biasing element is in contact with both the first frame and the motor base.

4. The transfer assembly of claim 2, wherein the one or more first suspension wheels and the one or more second suspension wheels are adapted to engage a track having a top and a bottom and wherein adjustment made to the adjustable biasing element regulates how much the drive wheel assembly is compressed against the bottom of the track when the one or more drive wheels are in contact with the bottom of the track, and the adjustable biasing element is in contact with both the first frame and the motor base.

5. The transfer assembly of claim 2, wherein the one or more first suspension wheels and the one or more second suspension wheels are adapted to engage a track, the transfer assembly also including an adjustment mechanism, adjustment of which regulates a clamping force exerted on the track by the one or more second suspension wheels and the drive wheel assembly.

6. The transfer assembly of claim 2, wherein the one or more first suspension wheels and the one or more second suspension wheels are adapted to engage a track having a top and a bottom and wherein adjustment of the adjustable biasing element regulates how much clamping force will be exerted on the track by the one or more second suspension wheels and the drive wheel assembly when the one or more drive wheels are in contact with the bottom of the track, and the adjustable biasing element is in contact with both the first frame and the motor base.

7. The transfer assembly of claim 1 comprising an adjustment gage sized to reveal when adjustment of an adjustable biasing element corresponds to a desired clamping force that the transfer assembly will exert on a track component of a rail when the transfer assembly is installed on the rail.

8. The transfer assembly of claim 7, wherein the adjustment gage is stowable on the transfer assembly.

9. The transfer assembly of claim 1, wherein the one or more first suspension wheels include a longitudinally inboard wheel and a longitudinally outboard wheel and a wheel or wheels of the drive wheel assembly are longitudinally midway between inboard and outboard suspension wheels.

10. The transfer assembly of claim 1, wherein:

the first frame and the second frame each include at least one connection site for connecting a hoist to the first frame and the second frame;

the one or more first suspension wheels and the one or more second suspension wheels are adapted to engage a track such that when engaged, weight applied to a hoist strap is distributed on the track by the one or more first suspension wheels and the one or more second suspension wheels; and the at least one connection site is arranged so that a net force resulting from the distributed forces is located longitudinally midway between longitudinally inboard suspension wheels.

11. The transfer assembly of claim 1, wherein:

the motor base includes left and right vertically extending flanges and a web extending laterally between the left and right vertically extending flanges; and the drive wheel assembly includes a left drive wheel and a right drive wheel, the drive wheel assembly being mounted on the motor base so that the one or more drive wheels are laterally between the left and right vertically extending flanges.

12. The transfer assembly of claim 11, wherein the first frame includes a base, a first leg extending vertically from the base and a second leg extending vertically from the base, the first leg and the second leg being longitudinally spaced from each other so that they straddle an axle of the drive wheel assembly.

13. The transfer assembly of claim 1, wherein:

the motor base includes left and right laterally separated, vertically extending flanges, a web spanning laterally between upper edges of the flanges, and a laterally unobstructed space between lower edges of the flanges;

the drive wheel assembly includes an axle residing between the left and right laterally separated, vertically extending flanges, the axle having a laterally extending axis; and the first frame includes a base, a first leg extending vertically upwardly from the base, and a second leg extending vertically upwardly from the base, and is installable by way of the laterally unobstructed space when the axle is in place and so that when so installed the first leg and the second leg extend vertically past the axle.

14. The transfer assembly of claim 1, including a cover having a north directional notifier and a south directional notifier, the north directional notifier corresponding to a first directional control element of a user interface and the south directional notifier corresponding to a second directional control element of the user interface and wherein the north directional notifier and the south directional notifier reveal a longitudinal direction in which the transfer assembly will be driven in response to actuation of the first directional control element and the second directional control element respectively, irrespective of an orientation of the user interface.

15. The transfer assembly of claim 14, wherein:

the north directional notifier includes a left side north notifier visible from a first lateral side of the cover and a right side north notifier visible from a second lateral side of the cover, the left side north notifier and the right side north notifier corresponding to the first directional control element; and the south directional notifier includes a left side south notifier visible from the first lateral side of the cover and a right side south notifier visible from the second lateral side of the cover, both the left side south notifier and the right side south notifier corresponding to the second directional control element, wherein the left side north notifier and the right side north notifier reveal the longitudinal direction in which the transfer assembly will be driven in response to actuation of the first directional control element and the left side south notifier and the right side south notifier reveal the longitudinal direction in which the transfer assembly will be driven in response to actuation of the second directional control element respectively, irrespective of the orientation of the user interface.

16. The transfer assembly of claim 1, wherein:

the motor base includes a left vertically extending flange and a right vertically extending flange;

the right vertically extending flange includes one or more right side openings each of which corresponds to a threaded hole on a housing of the motor assembly, each right side opening being sized so that a head of a fastener threaded into the threaded hole will not pass through the right side opening; and the left vertically extending flange includes one or more left side openings each of which corresponds to one of the one or more right side openings, each left side opening being oversized relative to the head of the fastener so the head of the fastener can pass through the one or more left side openings.

* * * * *